(12) United States Patent
Hunt et al.

(10) Patent No.: US 7,049,976 B2
(45) Date of Patent: May 23, 2006

(54) USER-INSTALLABLE POWER CONSUMPTION MONITORING SYSTEM

(75) Inventors: Hunter L. Hunt, Dallas, TX (US); Daniel G. Price, Dallas, TX (US); Hugh D. Baker, Jr., Dallas, TX (US); David A. White, Dallas, TX (US)

(73) Assignee: Hunt Power, L.P., Dallas, TX (US)

( * ) Notice: Subject to any disclaimer, the term of this patent is extended or adjusted under 35 U.S.C. 154(b) by 644 days.

(21) Appl. No.: 10/123,504

(22) Filed: Apr. 15, 2002

(65) Prior Publication Data

US 2003/0193405 A1    Oct. 16, 2003

(51) Int. Cl.
*H04M 15/00* (2006.01)

(52) U.S. Cl. .............. 340/870.02; 379/106.03; 379/106.06; 702/61

(58) Field of Classification Search .......... 340/870.02, 340/870.03, 3.54, 3.51; 348/160; 379/106.03, 379/106.06, 106.08, 93.07, 102.7; 702/61
See application file for complete search history.

(56) References Cited

U.S. PATENT DOCUMENTS

| | | | |
|---|---|---|---|
| 4,680,704 A * | 7/1987 | Konicek et al. ............ 382/100 |
| 4,749,992 A | 6/1988 | Fitzemeyer et al. |
| 5,434,911 A | 7/1995 | Gray et al. |
| 5,506,404 A | 4/1996 | Milan-Kamski |
| 5,541,589 A | 7/1996 | Delaney |
| 5,559,870 A | 9/1996 | Patton et al. |
| 5,590,179 A | 12/1996 | Shincovich et al. |
| 5,764,739 A | 6/1998 | Patton et al. |
| 5,852,658 A | 12/1998 | Knight et al. |
| 5,870,140 A | 2/1999 | Gillberry |
| 5,880,464 A * | 3/1999 | Vrionis ............... 250/230 |
| 6,622,097 B1 | 9/2003 | Hunter |

FOREIGN PATENT DOCUMENTS

| | | |
|---|---|---|
| EP | 0395495 B1 | 11/1994 |
| FR | 2728423 | 6/1996 |
| WO | WO 96/38897 A1 | 12/1996 |
| WO | WO 98/45717 | 10/1998 |
| WO | WO 99/57697 | 11/1999 |
| WO | WO 00/79500 A1 | 12/2000 |
| WO | WO 01/15114 A1 | 3/2001 |

* cited by examiner (Continued)

OTHER PUBLICATIONS

PCT International Search Report for International Application No. PCT/98/00319 dated Aug. 26, 1998.

*Primary Examiner*—Michael Horabik
*Assistant Examiner*—Hung Q. Dang
(74) *Attorney, Agent, or Firm*—Patton Boggs, LLP

(57) ABSTRACT

A system and method for remotely monitoring power usage from a watt-hour meter or power meter. The system may include a sensor, sensor terminal, and data collection unit. The sensor may be disposed external from the power meter and be consumer installable in an unobstructive position for direct viewing of power meter registers. The sensor terminal may be coupled to the sensor and include a receiver and transmitter operable to receive and transmit information indicative of motion of a rotating disk in the power meter sensed by the sensor. A data collection unit in communication with the sensor terminal may include a display for displaying various information to the consumer, such as current bill and power network notification indicators. The data collection unit may communicate with a service center that performs a power usage analysis to feedback information to the data collection unit for displaying to the consumer.

20 Claims, 15 Drawing Sheets

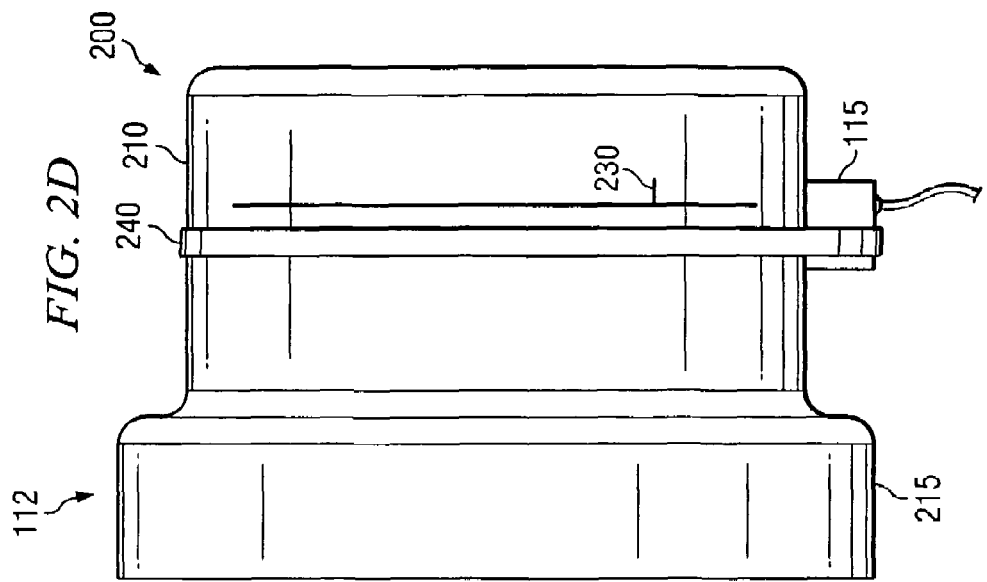
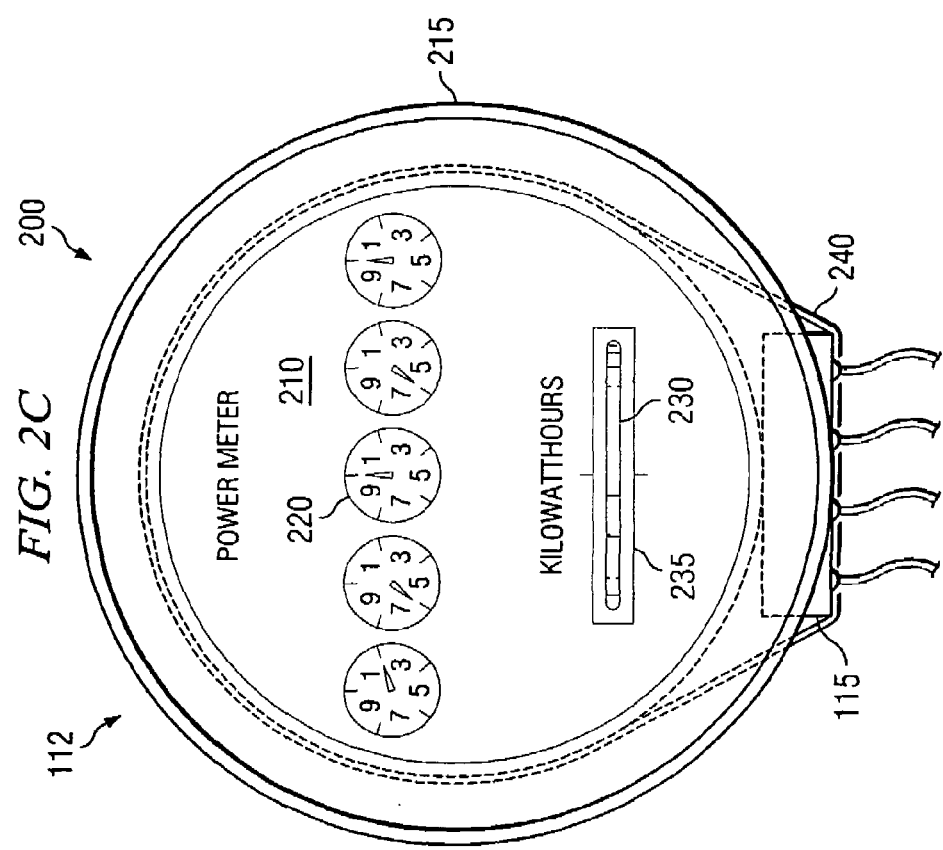

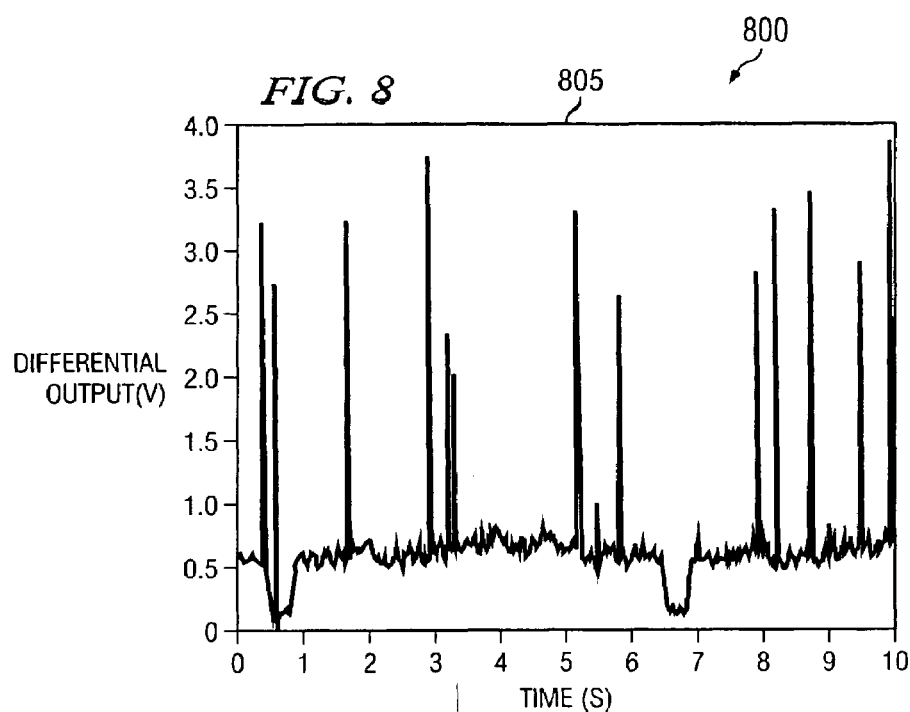
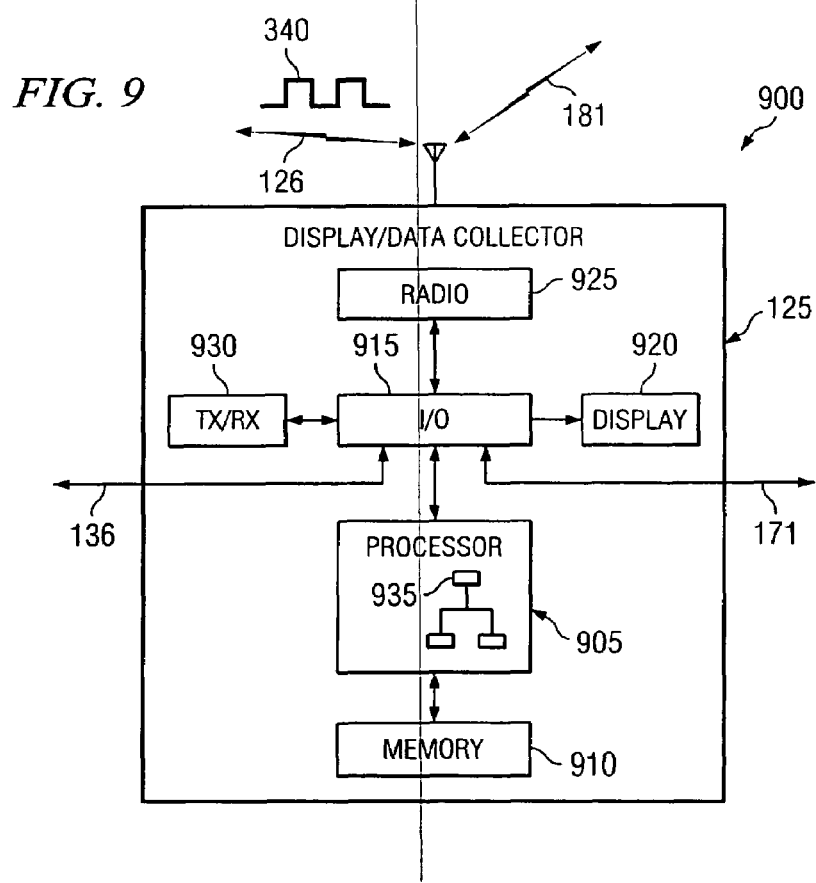

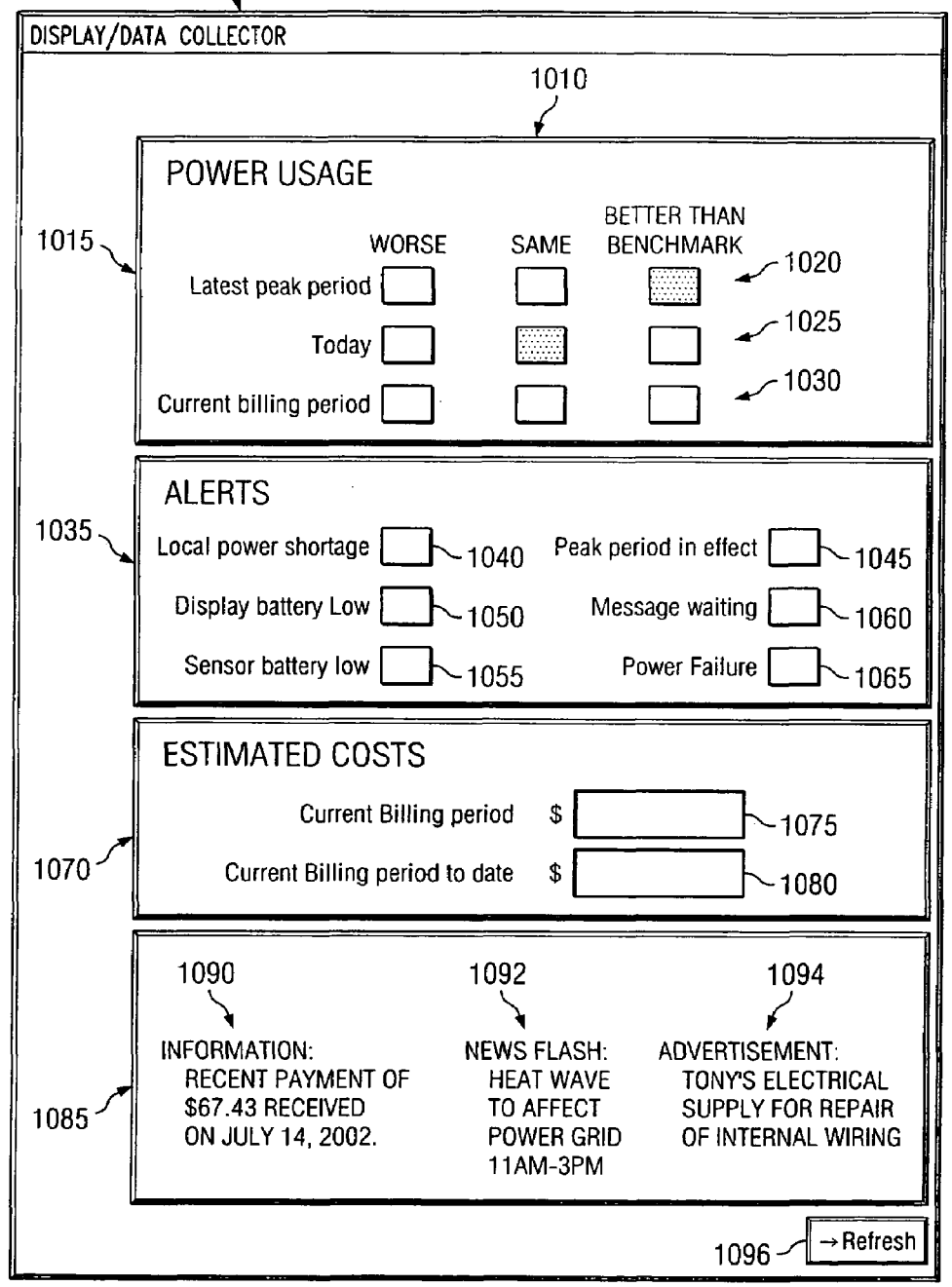

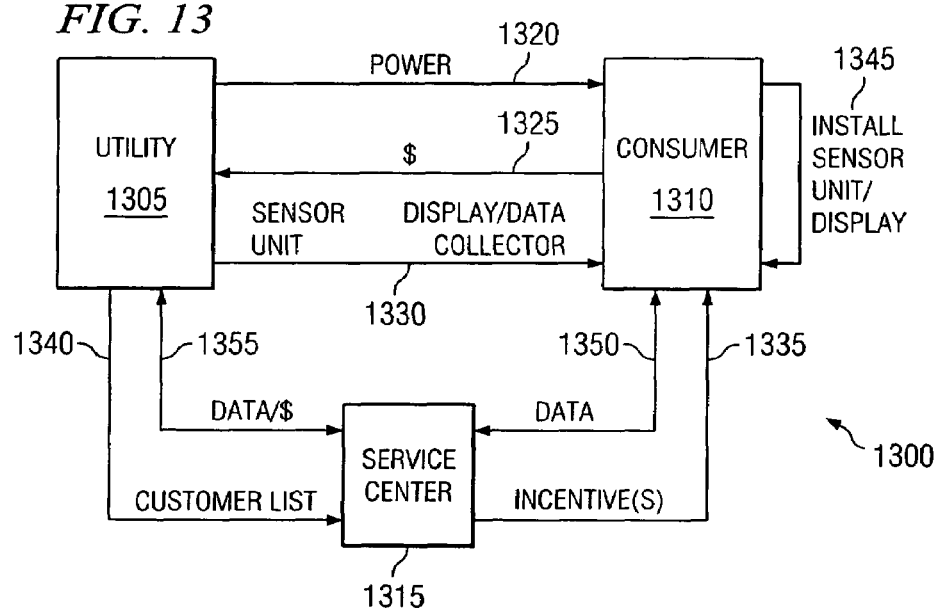

USER-INSTALLABLE POWER CONSUMPTION MONITORING SYSTEM

TECHNICAL FIELD OF THE INVENTION

The principles of the present invention generally relate to a power consumption or usage monitoring system, and more specifically, but not by way of limitation, to a user installable, interactive power usage monitoring system utilizing a display device.

BACKGROUND OF THE INVENTION

Energy usage has become more important to consumers or customer, energy producers and governmental bodies over the recent past. Much discussion has occurred regarding energy conservation, especially during peak heavy energy use periods. Generally, however, consumers are unaware of heavy use periods and are unable to assess energy usage until a monthly bill arrives at the end of the billing cycle. Additionally, because a customer has no readily available means to estimate a bill during the billing period, the consumer may be surprised financially when the bill arrives.

Remote meter reading devices, including electromagnetic field measuring devices, cameras, and optical sensors, have been utilized by power companies to reduce the need for a meter reader to be involved with the billing process and to improve estimates. To date, however, the meter reading devices utilized have had a variety of technical and cost problems and limitations. One typical approach used for installing a meter reading device is to mount the device on the inside of the meter socket (i.e., glass cover of the meter), which requires removal of the meter socket. However, according to most state Public Utilities Commission (PUC) rules, if the meter socket is separated from the meter, the meter has to be recalibrated, which is time consuming and expensive for the power company and/or consumer (generally no less than one-hundred dollars). In addition to recalibrating the meter, the PUC rules state that a person must be legally certified to install the device inside the meter. During the installation process, power to the meter must be turned off and, of course, functional operation of the meter is interrupted. Furthermore, as understood in the art, electronic devices installed inside the meter socket potentially may affect the operation of the meter, which may impose a load or drag on the measurement mechanism of the meter and affect accuracy of the meter.

Another approach used for designing and installing a meter reading device is to design a device to measure the electromagnetic fields of the power lines or electrical devices of the meter and to mount the device inside the meter-can (i.e., metal casing or base of the meter). This approach is also subject to the aforementioned PUC rules. In order to install the meter reading device, the actual meter may be removed and a sleeve, such as a socket adapter, is inserted. The sleeve is primarily used for mounting the meter reading device. As is apparent, this method of installation requires a certified technician for recalibration of the meter, which, again, is expensive and time consuming.

Others have designed remote sensors, such as cameras and optical sensors, that may be mounted on the outside of the meter socket. In the case of using a camera, the camera is generally cost, bandwidth, and memory prohibitive for the power company In the case of using an optical sensor, designers have been required to use an opaque or reflective shield that covers the meter socket to reduce or eliminate shadows and maintain a consistent lighting environment to reduce measurement error. The shield, however, obstructs viewing registers (i.e., dials) located on the front of the meter, thereby making it difficult for a meter reader to perform meter reading duties. As many utilities and/or public utility companies have rules on being able to clearly see the registers, having a shield preventing such direct viewing violates the rules. Additionally, installation for average consumers is generally not possible, thereby requiring a certified technician to install the system and, again, substantially increasing costs for the power company.

In addition to the meter reading devices, conventional meter reading devices are coupled to data collection units. A data collection unit may independently poll the meter reading device for power usage data and automatically report the power usage data to an affiliated data center. While the automatic data collection aids the power company, a consumer utilizing the data collection units generally still does not have active or passive access to their energy usage prior to the end of the monthly billing period and receive a monthly utility billing statement. And, because the consumer does not have access to interim energy usage, the consumer ultimately becomes complacent and simply relies on the monthly bill. Without having more immediate or up-to-date feedback, the consumer generally does not alter power usage practices.

Some data collection units may be coupled to a consumer location or an on-site display device, which may be utilized by a service technician or by on-site meter reading personnel when telephone communications are inoperative. The display device may also be used to passively display information received from a data center, including interim power usage and billing information. In addition to receiving power usage data, the display device has been further used to generate utility bills or estimates and/or send home appliance status messages to the data center. Although a consumer may be informed of their current cost-to-date or accumulated energy usage, there is little or no other energy status information available to the consumer. For example, the consumer is generally not privy to power constraints, high cost schedules of the power company, and power grid operational problems. And, without having such information, a consumer may not be able to assist actively in reducing energy load or save money by conserving energy.

SUMMARY OF THE INVENTION

To overcome (i) expensive and time consuming installation of meter reading devices and (ii) consumers having restricted involvement in energy conservation efforts, a user-installed power usage monitoring system may be utilized by a consumer of a power company. One embodiment according to the principles of the present invention includes a system and method for remotely monitoring power usage from a watt-hour meter (i.e., power meter) utilized to monitor power usage from power usage of a consumer. The system may include a sensor, sensor terminal, and data collection unit. The sensor may be disposed external from the external surface of the watt-hour meter and be easily installed such that a consumer may perform the installation. The disposition of the sensor may be in an unobstructive position for direct viewing of register(s) located on the front of the watt-hour meter by an individual performing meter reader duties. The sensor terminal may be coupled to the sensor and may include a receiver and transmitter. The receiver may be operable to receive pulses sensed by the sensor and the transmitter may be operable to transmit information indicative of the power usage to the data collection unit. The data collection unit may include a receiver for receiving the information indicative of the power usage from the sensor terminal. Additionally, the data collection unit may include a display to display various information to the consumer, such as intermittent energy costs and notification indicators to alert the consumer of a high cost period or strained power grid, for example. The data collection unit may be coupled to a telephone line for communication with a service center that may perform various levels of analysis to feed-back to the data collection unit for display to the consumer.

BRIEF DESCRIPTION OF THE DRAWINGS

A more complete understanding of the principles of the present invention and the scope thereof is more readily appreciated by reference to the following Detailed Description of the embodiments presented of the present invention and to the appended claims when taken in conjunction with the accompanying Drawings wherein:

FIGS. 2A–2D illustrate exemplary positioning of an optical sensor of the remote power meter monitoring system of FIG. 1 on a power meter;

FIG. 8 illustrates an exemplary plot of differential output of FIG. 7;

FIGS. 9 and 10 illustrate an exemplary display/data collector unit of FIG. 1;

FIG. 13 illustrates an exemplary block diagram for providing commercialization of the remote power meter monitoring system of FIG. 1.

DETAILED DESCRIPTION OF THE DRAWINGS

The principles of the present invention will now be described more fully hereinafter with reference to the accompanying drawings, in which exemplary embodiments of the present invention are shown. This invention, however, may be embodied in many different forms and should not be construed as limited to the embodiments set forth herein; rather, these embodiments are provided so that this disclosure will be thorough and complete, and will fully convey the scope of the invention to those skilled in the art.

The principles of the present invention include utilization of (i) a user-installable sensor coupled to a sensor terminal for sensing a power meter and (ii) an on-site display/data collection unit that may be in communication with an energy provider or data center associated therewith. The display/data collection unit provides a consumer with interface capabilities for viewing power usage, notification messages, and cost estimates. Additionally, the display/data collection unit may provide the consumer with real-time or up-to-date feedback on the power usage. Thus, up-to-date pricing and power constraints may be provided to the consumer to encourage shifting of power usage during peak power usage periods.

In one embodiment, the sensor may be disposed external of a watt-hour meter. A consumer may install the sensor in an unobstructive position to allow for direct viewing of register(s) located on the front of the watt-hour power meter. The display/data collection unit may poll the sensor terminal for power usage data. Upon receiving the power usage data, the display/data collection unit may then process and/or communicate the power usage data to a server associated with a power provider (e.g., electric company). Results of an analysis performed on the power usage data may be received by the display/data collection unit and displayed as power usage status indicator(s). Notification indicator(s) or alerts may additionally be communicated to the display/data collection unit. The consumer may then use the results to determine billing cost estimates and the notification indicator(s) to selectively conserve energy and save money.

Figure 1:
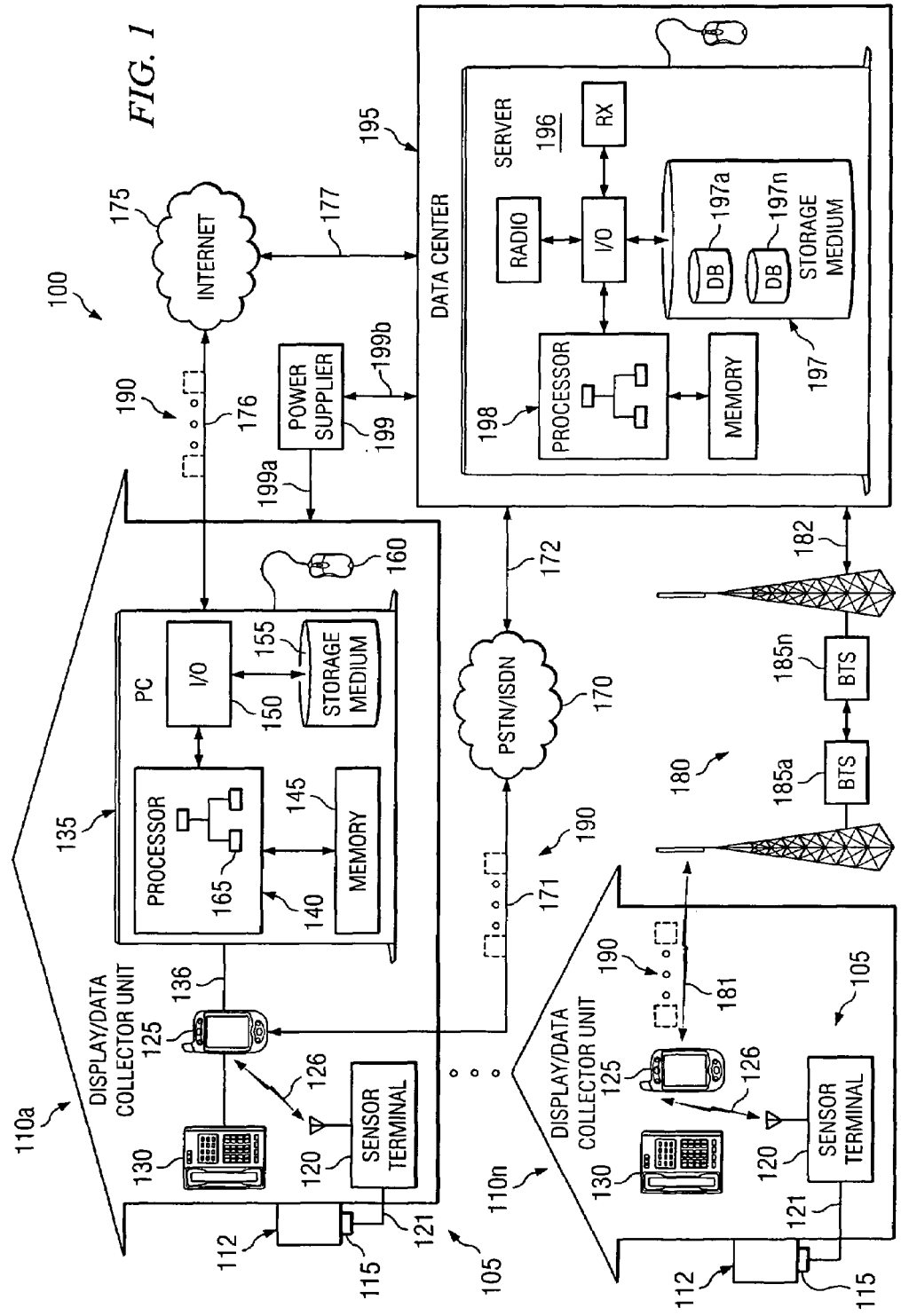
FIG. 1 illustrates an exemplary block diagram of a remote power meter monitoring system for operating the principles of the present invention.

FIG. 1 illustrates an exemplary block diagram 100 of a remote power meter monitoring system 105 for operating the principles of the present invention. The remote power meter monitoring system 105, which monitors power usage of buildings 110a–110n (e.g., residences or businesses) each having a power meter 112 for indicating power usage at the specific site, includes an optical sensor 115 associated with the power meter 112, a sensor terminal 120 electrically connected to the optical sensor 115 via the connector 121, and a display/data collector unit 125 that communicates with the sensor terminal 120 via signals 126. It should be understood that the remote power meter monitoring system 105 may be adapted to also monitor other utility meters, such as gas and water meters. The display/data collector unit 125 may be powered by any internal or external source of power, including, without limitation, a battery, power outlet (not shown), telephone jack 130, and/or computer 135 via a serial cable 136. The computer 135 includes a processor 140 coupled to a memory 145. The processor 140 may be further coupled to an input/output (I/O) device 150, which may be additionally coupled to a storage medium 155. A control device 160, such as a computer mouse, keyboard, joystick, touch screen, and/or voice recognition, may be coupled to the computer 135 for controlling an energy audit software program 165 operating on the processor 140. The storage medium 155 may provide the energy audit software program 165 with predefined commands and/or power usage data to populate power usage charts (e.g., tables and graphs) discussed in greater detail with regard to FIG. 10.

Additionally, the display/data collector unit 125 may be further coupled to (i) a telecommunications network 170 via an internal communications device attached to a phone line 171 of the consumer, (ii) the Internet 175 via the phone line 171 or other interface line 176 to the internal modem or a serial port of the computer 135, and/or (iii) a wireless communication system 180 via radio signals 181 through a network of base transceiver stations (BTSs) 185a–185n; all three of which being operable to communicate data packets 190 from the display/data collector unit 125 to a data center 195 via communication ports 172, 177, and 182 respectively. The wireless communication system 180 allows for ease of installing the display/data collector unit 125 conveniently displays up-to-date power usage information on a display (e.g., liquid crystal display) for the consumer.

The data center 195 processes data and performs other functions for communicating between the consumer and a power supplier 199. As understood in the art, the power supplier 199 generates electricity that is received by the consumer via a power grid 199a. The data center 195 handles the bulk of computational and data storage operations on an affiliated server 196 comprising a storage medium 197 and a processor 198. The storage medium 197 may include a single database or multiple databases (DB) 197a–197n for storing the data communicated in the data packets 190 received from the display/data collector unit 125. The processor 198 processes the data received and stores the results in the databases 197a–197n. Such data may include relevant consumer information for specific individuals or aggregate data based on many individuals in a given region or according to other demographic metrics. Using the processed data, the data center 195 provides up-to-date feedback to the display/data collector unit 125 for the consumer to view and use to reduce energy costs.

In an alternative embodiment, the display/data collector unit 125 may be semi or complete stand-alone with capacity to handle some or all the operations of the data center 195. Using such an embodiment, the display/data collector unit 125 may use an electrically erasable programmable read only memory (EEPROM) to update electrical tariffs (i.e., billing rates), benchmark data (standards used for comparison), and algorithms via a wireless connection with the data center 195 to update various system specific information in the display/data collector unit 125.

The optical sensor 115 and sensor terminal 120 (forming a sensor unit) may be mounted on the power meter 112 or near it on the wall of the associated building(s) 110a–110n. The display/data collector unit 125 may be located in the consumer's building(s) 110a–110n or alternatively at a central control location (e.g., management office of building complex). For example, an apartment or building complex may locate the display/data collector unit 125 at a central office to provide a supervisor with power usage information from one or more power meters 112. The optical sensor 115 collects data regarding the power usage of the consumer by sensing motion of a rotating disk, for example, in the power meter 112, and may transmit such collected power usage data periodically, aperiodically, or whenever it receives a polling transmit signal from the display/data collector unit 125. Alternatively, the power usage data may be communicated on an event-driven basis. The display/data collector unit 125 may then transmit this power usage data via data packets 190 to the data center 195 automatically or at predetermined times specified by the consumer or the power supplier. The data center 195 processes the consumer's power usage data and provides up-to-date feedback to the display/data collector unit 125. Either the display/data collection unit 125 or data center 195 may compare the feedback on the consumer's power usage against a meaningful benchmark profile provided by the data center 195 to generate a power usage benchmark profile. Thereafter, the display/data collector unit 125 may display the power usage benchmark profile and other data from the data center 195 for analysis by the consumer. It should be understood that the display/data collector unit 125 may communicate with the data center 195 on a periodic or non-periodic basis through the consumer's existing phone line or wirelessly as described above, and that the sensor terminal 120 may wirelessly transmit to the display/data collector unit 125 in shorter intervals.

Figure 2A:
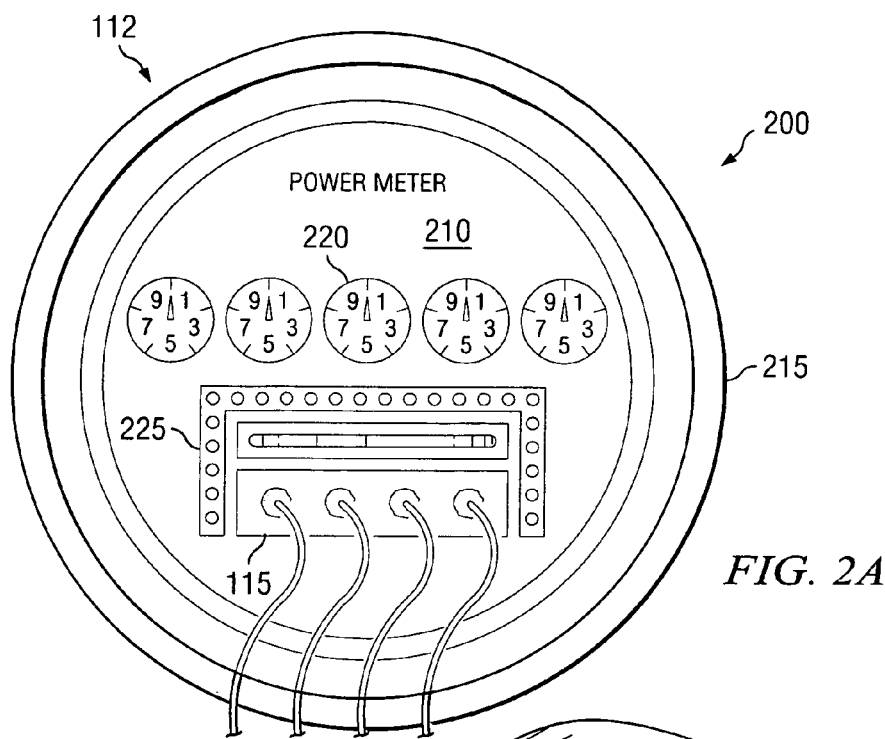
Figure 2B:
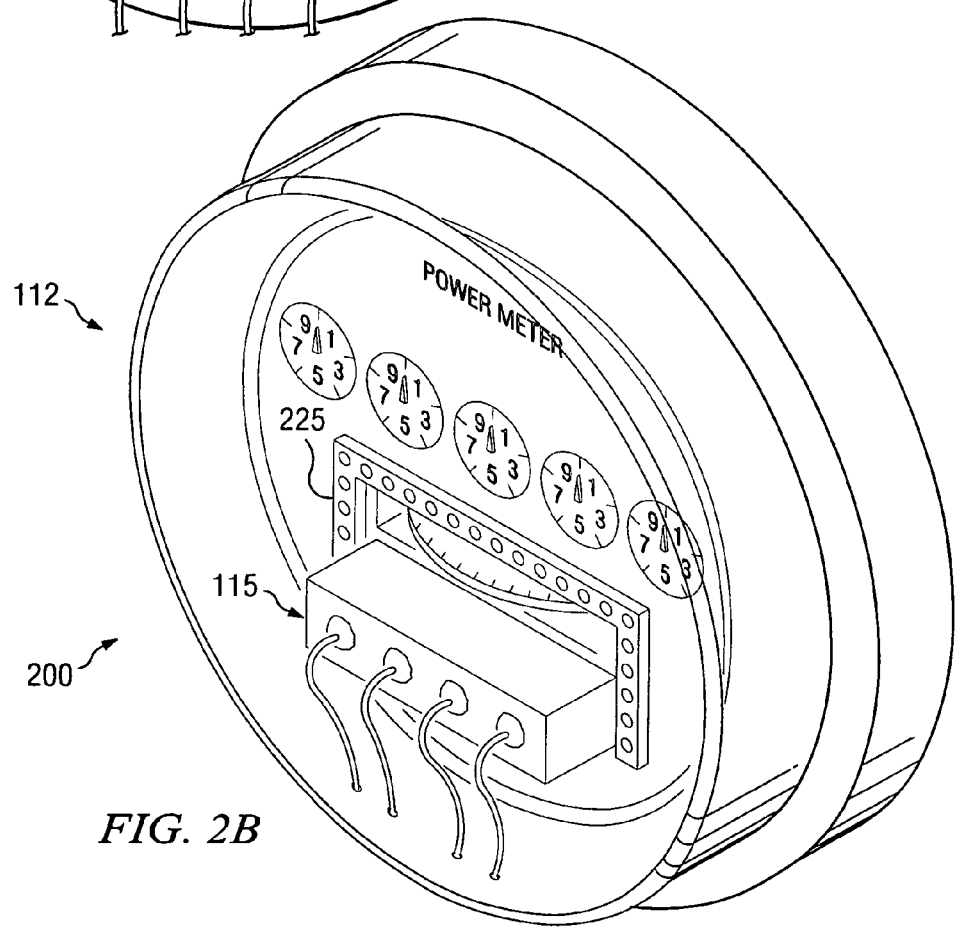

FIGS. 2A–2D (collectively FIG. 2) illustrate exemplary configurations 200 of the power meter 112 having the optical sensor 115 of the remote power meter monitoring system 105 associated therewith. FIGS. 2A and 2B provide front and perspective views of the optical sensor 115 for reading the power meter 112 via a front orientation, and FIGS. 2C and 2D provide schematic front and side views of the optical sensor 115 for reading the power meter 112 via a bottom orientation. The power meter 112 comprises a meter-can 215 serving as a base, a meter socket 210 removably mounted on the meter-can 215, a set of registers or dials 220, and a revolving disk 230 disposed within and viewable all through the meter socket 210. The optical sensor 115 may be built-in or mounted on the power meter 112 with different types of meter mounts 225 that are user-installable.

As shown, the optical sensor 115 is disposed outside the meter socket 210 so that installation of the optical sensor 115 does not require that the meter socket 210 be removed from the meter-can 215. Since installation of the optical sensor 115 does not require removal of the meter socket 210, the power meter 112 does not have to be recalibrated by a technician. Furthermore, the optical sensor 115 is mounted so that the view of the registers 220 is not obstructed. Positioning the optical sensor 115 external from the meter socket 210 using a meter mount 225, permits the optical sensor 115 to read the rotating disk 230 of the power meter 112 without being "inside the glass" of the meter socket 210 and without interfering with the view of the registers 220 or other normal operations of the power meter 112. In one embodiment, the meter mount 225 may be an adhesive coupled to a support for the optical sensor 115. Alternatively, the meter mount 225 may include a bracket for supporting the optical sensor 115 in a front view relation to the power meter 112. Additionally, the external positioning of the optical sensor 115 makes it user-friendly in that: (1) little or no wiring is utilized; (2) installation for the average consumer is relatively simple; and (3) the possibility of electrocution during installation is greatly reduced.

The placement of the optical sensor 115 may be relatively imprecise without affecting overall accuracy of reading the power meter 112. As shown in FIGS. 2A and 2B, the optical sensor 115 is mounted on the front face of meter socket 210 by coupling the base of the optical sensor 115 to the sensor mount 225, which is alignable so that the optical sensor 115 can view the edge of the rotating disk 230. As shown in FIGS. 2C and 2D, the optical sensor 115 may be mounted on the side wall of the meter socket 210 and moved about the meter socket 210 to direct the beam from the optical sensor 115 at either surface or the edge of the rotating disk 230 depending on its orientation within the meter socket 210. The rotating disk 230 is marked on either its edge or one of its surfaces with a rotation indicator 235 that can be a dark strip or other indicator, having a reflectance different from the rest of the rotating disk 230 that can be viewed from a static position each time the rotating disk 230 makes a complete revolution. The optical sensor 115 is aligned to obtain a correct reading of the rotation indicator 235 from any fixed position outside the meter socket 210 as shown in the embodiments described above. An alternate means for aligning the optical sensor 115 with the rotating disk 230 may include placing a simple optical lens on the meter mount 225 to align and/or focus the optical sensor 115 on the rotation indicator 235. It should be understood that many different embodiments can be designed for mechanically and/or optically aligning and mounting the optical sensor 115 as long as the view of the registers 220 remains substantially unobstructed for viewing by a meter reader (i.e., a person who visually reads power meters).

In another embodiment shown in FIGS. 2C and 2D, a strap 240 may allow the consumer to align the optical sensor 115 in relation to the rotating disk 230 by securing the strap 240 using elastics, clips, hook-and-loop fasteners, etc., to the meter socket 210 or meter-can 215. Use of the strap 240 provides for the optical sensor 115 to be positioned or oriented in an unobstructive view of the registers 220, such as below the rotating disk if the rotation indicator 235 is located on the bottom surface of the rotating disk 230, without utilizing adhesives. The optical sensor 115 may be positioned above the rotating disk 230 if the rotation indicator 235 is located on the top of the rotating disk 230.

The optical sensor 115 may use an infrared emitter/phototransistor pair to illuminate and detect a change in light reflected off the rotating disk 230 during or in the absence of the rotation indicator 235 being illuminated by the optical sensor 115. Changes in the reflectance of the rotating disk 230 results in the optical sensor 115 generating pulses having different magnitudes based on the absence or presence of the rotation indicator 235, respectively. The pulses having different magnitudes result from the rotating disk 230 being of a reflective material, such as aluminum, or having a light colored surface with the exception of the rotation indicator 235. Reflection from the light portion of the rotating disk 230 is higher than reflection of the rotation indicator 235, thereby producing the different voltage levels from the optical sensor 115. The optical sensor 115 may include an emitter/phototransistor pair (e.g., QED 123-ND T1 −3/4 880 nm (QT Optoelectronics)/QSC 112-ND T1 880 nm (QT Optoelectronics)) for generating and receiving a narrow beam and having a reception angle of approximately eight degrees. However, it should be understood that other emitter/phototransistor pairs may be used instead and allow for different reception angles. By using the aforementioned emitter/phototransistor, the optical sensor 115 may image the rotation indicator 235 from a distance ranging from at least 13 to 18 mm.

As understood in the art, the distance of the rotating disk 230 from the meter socket 210 varies across power meter models (e.g., Schlumberger J5S and J4FS, ABB AB1R, GE 1-70-S, Sangamo J3S and JA, Westinghouse D2S, etc.) from at least 13 to 18 mm. Thus, the distance of the background surface (the aluminum plate with the dials and model info) also varies across models from at least 14 to 25 mm. It should be understood that the optical sensor 115 may be designed to operate properly on a large variety of power meter models without the need for tuning or realignment.

Figure 3:
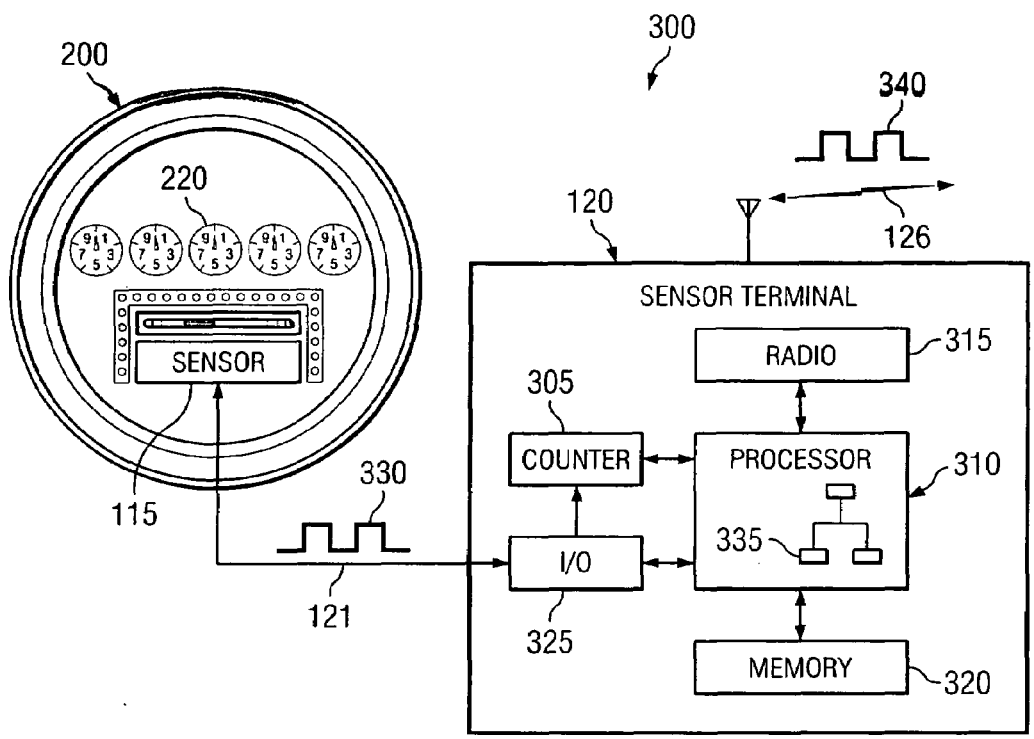
FIG. 3 illustrates exemplary coupling of a sensor terminal to the optical sensor of FIG. 2.

FIG. 3 illustrates as exemplary embodiment 300 of the sensor terminal 120 coupled to the optical sensor 115 of FIG. 2. The sensor terminal 120 may be hard-wired to the optical sensor 115 via the connector 121 and mounted on the wall of the associated building(s) 110a–110n supporting the power meter 112 or on the power meter 112 itself The sensor terminal 120 may include electronics, such as a counting device 305 coupled to a processor 310 and radio 315. The processor 310 may be further coupled to a memory 320 and an input/output (I/O) device 325. The I/O device 325 receives data signals 330, which may be analog or digital, from the optical sensor 115. The received data 330 may be time-stamped by a clock or data processing software program 335 operating on the processor 310. A unique identification number may be assigned to the sensor terminal 120 and stored in the memory 320.

The electronics of the sensor terminal 120 may include both digital and analog components (including an analog-to-digital (A/D) converter) for receiving the data signals 330. Alternatively, the sensor terminal 120 may include digital components only and the optical sensor 115 may include an A/D converter. In operation, the data signals 330 may be counted by the counting device 305. Alternatively, the processor 310 may perform a counting operation to determine power usage by the consumer. In either case, the sensor terminal 120 processes the data signals 330 to generate power usage signals 340 indicative of the power usage data described above and transmit the power usage signals 340 via the radio signals 126 to the display/data collector unit 125 periodically, aperiodically, or upon a polling signal being received by the sensor terminal 120 from the data center 195.

In addition to transmitting the power usage signals 340, the sensor terminal 120 further may determine a low power condition and transmit a low power alert to the display/data collector unit 125 when a battery (not shown) operating the sensor terminal 120 needs to be replaced. It should be understood that the sensor terminal 120 may communicate unidirectionally or bidirectionally. In the case of a bidirectional communication, the sensor terminal 120 may include a receiver in the radio 315 for receiving information, such as time correction or polling requests.

Figure 4A:
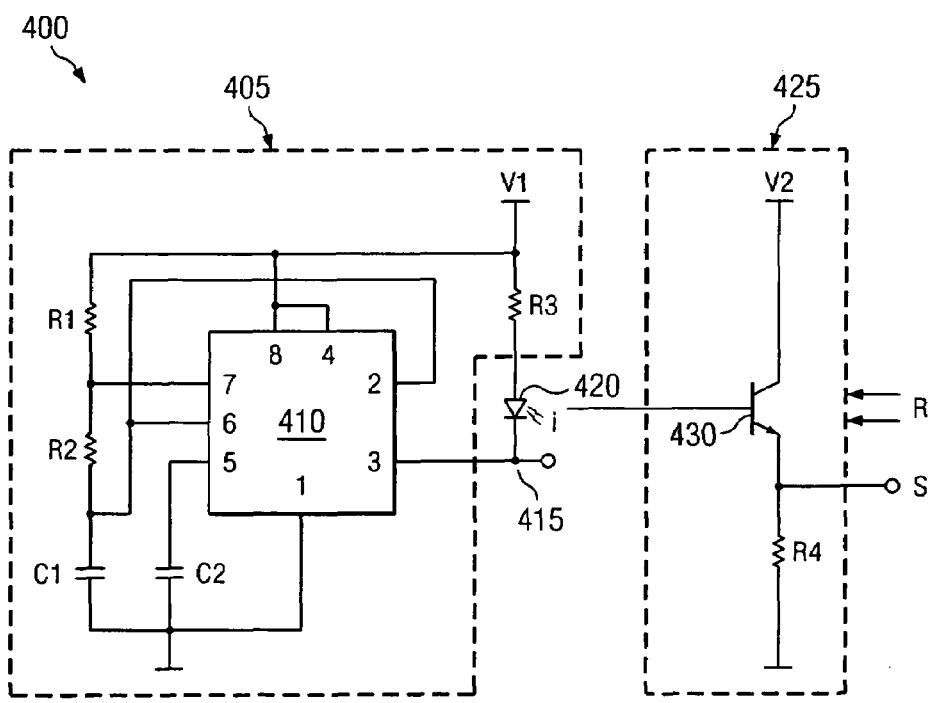
FIG. 4A illustrates exemplary circuit schematics of the optical sensor of FIG. 2, FIG. 4B provides exemplary measurements of the rotating disk of FIG. 2 starting at two points in time.

FIG. 4A illustrates an exemplary sensing circuit schematic 400 of the optical sensor 115 of FIG. 2 comprising a sensing circuit 405 including a timer 410, such as an LM555 timer (i.e., one-shot multivibrator) having a trigger output signal 415, components R1, R2, R3, C1 and C2, and an infrared (IR) light emitting diode (LED) 420 connected between the resistor R3 and the trigger output signal 415. The trigger output signal 415 of the sensing circuit 405 controls the operation of the LED 420 for illuminating the rotating disk 230 (See FIG. 2) with an incident beam of light (i) during an adjustable illumination cycle time, $\Delta T$. A phototransistor circuit 425 may be utilized for receiving light reflected (r) by the rotating disk 230. The phototransistor circuit 425 includes a resistor R4 and a phototransistor 430 sensitive to the infrared source of light (i). As understood in the art, current flow is reduced when light applied to the phototransistor 430 is reduced. Component values of the sensing circuit 400 are shown in TABLE 1. It should be understood that the component values are exemplary and that other component values may be utilized to produce the same or similar functionality.

TABLE 1

| Component | Value |
| --- | --- |
| R1 | 1.1 MΩ |
| R2 | 12 KΩ |
| R3 | 120 Ω |
| R4 | 1 KΩ |
| C1 | 0.01 μF |
| C2 | 0.01 μF |

Resistors R1 and R2 are utilized to control the duty cycle of the timer 410 as understood in the art. It is desirable to minimize the current usage of the sensing circuit 400. Therefore, the components of the sensing circuit 400 have the following ratings: (i) the timer 410 may consume a constant 200 µA, (ii) the LED 420 may consume a peak 30 mA and an average 300 µA, and (iii) the phototransistor 430 may consume 1–3 mA, depending on ambient lighting conditions at the buildings 110a–110n. The current consumed by the phototransistor 430 may be reduced further by a factor of 50 percent or more if the phototransistor 430 is turned on by the LED 420, and kept on for approximately 80 µsec after the LED 420 is turned off, i.e., the ambient cycle time, Δt. As a result, the optical sensor 115 may be capable of measuring light levels both with the LED 420 on and off. In this case, the overall current usage of the phototransistor 430 may be approximately 600 µA on average. Alternatively, this technique may be accomplished by a clock or timer operating on the processor 310.

Power usage may also be minimized by flashing the LED 420 with a frequency of 120 Hz and a duty cycle of 1% (e.g., 83 µsec out of 8.3 msec), which is set by the values of the resistors R1 and R2. The sampling frequency may be set high enough to sample (i.e., illuminate and measure reflectance) the rotation indicator 235 at least three times (at a maximum speed of one revolution per second (1 rev/sec)). In addition, the LED 420 is chosen to have a higher ON duration than the sampling period of the A/D converter.

Resistor R3 controls the amount of current used to drive the LED 420. Resistor R4 controls the sensor output voltage, S, differential between the ON duration and OFF duration of the LED 420. Given that current differential is equal to approximately 0.5 mA, and resistor R4 is equal to 1KΩ, the sensor output voltage differential is approximately 500 mV (0.5V). The sensor output voltage differential may be utilized to determine whether or not the rotation indicator 235 is being sensed at any particular point-in-time.

Both a power supply voltage V1 and voltage V2 may be substantially equal to the same voltage of 4.5V. However, in order to minimize energy usage, voltage V2 may be pulsed in a similar manner as described for the LED 420. Also, as the voltage V2 increases, a higher current level flows across the phototransistor 430. A high current level may cause the phototransistor 430 to saturate. On a typical sunny day in the afternoon, the outside lighting may cause the current on the phototransistor 430, with the LED 420 on, to become about 2.5 mA. Specifically, when voltage V2 equals 4.5V and resistor R4 equals 1KΩ, the saturation current is about 3.8 mA. As mentioned earlier, one way to increase the saturation current is to raise voltage V2. Another way to increase the saturation current is to measure the current on the phototransistor 430 with an operational amplifier instead of a simple resistor as understood in the art It should be noted that the sensing circuit 405 may also operate properly in the presence of rapidly changing lighting conditions, which is discussed in further detail with regard to FIG. 7.

Figure 4B:
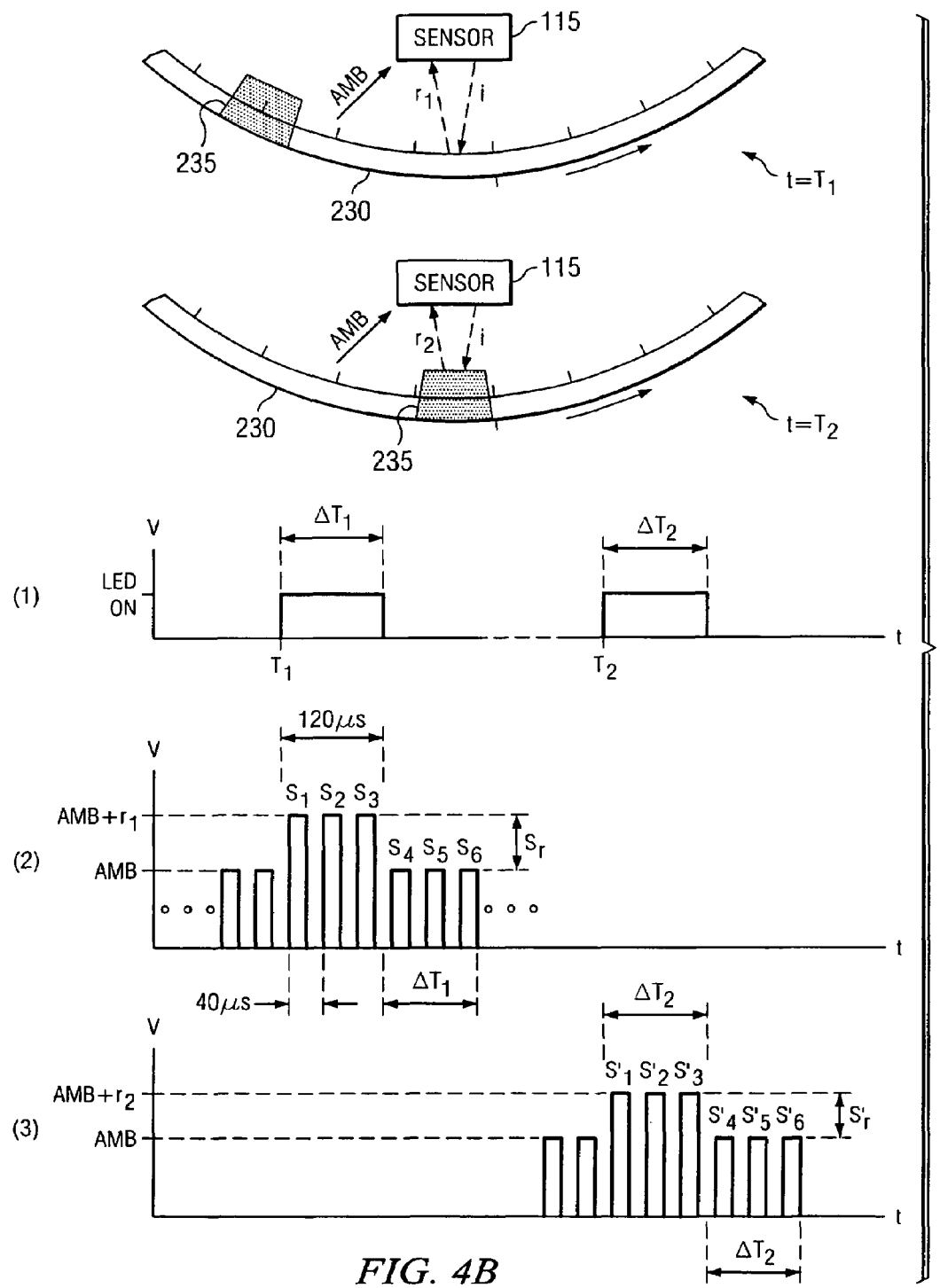
FIG. 4C illustrates an exemplary flow diagram for detecting a rotation indicator on a rotating disk of the power meter of FIG. 2.

FIG. 4B includes partial schematic views of the optical sensor 115 and the rotating disk 230 at two different times, t=$T_1$ and $T_2$, with the rotation indicator 235 becoming present shortly before the time $T_2$. The LED 420 of the optical sensor 115 illuminates the rotating disk 230 with the incident beam of light (i) at both times, $T_1$ and $T_2$, for the illumination cycle time $\Delta T_1$ in response to the trigger output signal 415 as shown in FIG. 4B(1). The LED 420 is triggered or pulsed at a frequency of about 120 Hz for a cycle time $\Delta T_1$ or about 120 µs. The phototransistor circuit 425 of the optical sensor 115 senses both the ambient light (amb) and the light reflected ($r_1$ and $r_2$) by the rotating disk 230 from the incident beam of light (i) at both times, $T_1$ and $T_2$, respectively, during the illumination cycle times $\Delta T_1$ and $\Delta T_2$ and the ambient cycle times $\Delta T_1$ and $\Delta T_2$ as shown in FIGS. 4B(2) and 4B(3).

Referring more specifically to FIG. 4B(2), the output voltage, S, of the phototransistor circuit 425 is sampled at a rate of about 25 KHz or every 40 µs. Thus, during the first illumination cycle time $\Delta T_1$ of the LED 420, three sample "illumination" voltages $S_1$–$S_3$ are measured and indicative of the ambient light (amb) and the light reflected ($r_1$) by the rotating disk 230 from the incident beam of light (i) without the rotation indicator 235 being present. After the first cycle time $\Delta T_1$ the LED 420 is turned off during the first ambient cycle time $\Delta t_1$, but the phototransistor circuit 425 continues to sample the ambient light (amb) to generate additional sample "ambient" voltages $S_4$–$S_6$ indicative of the ambient light (amb). The difference between the illumination and ambient sample voltages $S_1$-$S_3$ and $S_4$–$S_6$, respectively, i.e., non-indicator reflection voltage difference $S_r$, represents the voltage or intensity of the light reflected ($r_1$) by the rotating disk 230 without the rotation indicator 235 being present, thus neutralizing the effect of the ambient light (amb) on the reflected light ($r_1$).

The same process occurs for the second illumination cycle time $\Delta T_2$ of the LED 420 and the ambient cycle time $\Delta t_2$ to generate another set of voltage samples $S_1'$–$S_3'$ and $S_4'$–$S_6'$ as described above and shown more specifically in FIG. 4B(3), where the difference between the illumination and ambient sample voltages, $S_1'$–$S_3'$ and $S_4'$–$S_6'$, respectively, i.e., indicator reflection voltage difference $S_r'$, represents the voltage or intensity of the light reflected ($r_2$) by the rotating disk 230 in the presence of the rotation indicator 235. In this embodiment, the rotation indicator 235 is a dark marking as described above reflecting much less of the incident beam of light (i) so that the voltage or intensity of the light reflected ($r_2$) is much less than that of the light reflected ($r_1$) by the rotating disk 230 during the first cycle time $\Delta T_1$. Thus, each time the rotating disk 230 makes a complete revolution, the rotation indicator 235 passes the sensor 115 and generates an indicator reflection voltage $S_r'$ different from the non-indicator reflection voltage difference $S_r$ so that a rotation detect signal R (not shown) is generated for each resolution of the indicator 235. The rotation detect signal R may be generated by comparing successive non-indicator reflection voltage differences $S_r$ for each illumination cycle $\Delta T$ or by any other signal detection means. The sensor 115 transmits the rotation detect signals R to the sensor terminal 120 via the connector 121 as a series of data signals that are counted and processed over time to generate power usage signals 340 indicative of power usage by a consumer. These measurements and comparisons are accomplished even though the ambient light (a) varies because sampling continues after the LED 420 is cycled off during the ambient cycle time, $\Delta t_1$. Pulse and sampling rates of the LED 420 and the phototransistor circuit 425 may be varied as required by different meters 112.

The data processing software program 335 of the sensor terminal 120 performs a variety of functions including determining whether the rotation indicator 235 is present based on whether the indicator $S_r$ or non-indicator $S_r'$ reflection voltage difference is measured. Because of the differential measurement, the measurement is substantially invariant to ambient light level and fluxuations due to momentary shadows. Any measurement errors may be filtered out using signal processing techniques as understood in the art. Specifically, to compute the differential output for each pulse, the sensor terminal 120 and optical sensor 115 may perform the following operations:

1. Responsive to a trigger signal, the LED 420 is pulsed (i.e, turned on) to illuminate the rotating disk 230 for a predetermined time duration (e.g., 120 µs), and the output sensor (e.g., phototransistor 430) may be sampled over a time duration (e.g, 240 µs) at a particular interval rate (e.g., 40 µs). For example, sampling at 25 KHz produces six samples, a first three while the LED is on (e.g., $\Delta T_1$) to measure the ambient light (amb) plus the reflected signal $r_1$ and a second three while the LED is off($\Delta T_1$) to measure the ambient light level (amb) (see, FIG. 4B, sample voltages $S_1$–$S_3$ and $S_4$–$S_6$).

2. Set a variable V_max equal to the maximum sampled value of the first three sample voltages (e.g., $S_1$–$S_3$), and set a variable V_min equal to the minimum sampled value of the second three sample voltages (e.g., $S_4$–$S_6$). It should be understood that the order of the first and second samples may be switched. It should further be understood that other sampling schemes, such as alternating the LED 420 on and off, may be utilized.

3. The differential output signal, having an approximate magnitude of either the indicator $S_r$ or non-indicator $S_r'$ reflection voltage difference, may be computed by: V_d=V_max−V_min. Because a differential sampling of light levels is performed very quickly, 40 µs apart over a span of 240 µs, and shadows are unlikely to start or stop within such a narrow interval (i.e, altering lighting conditions are substantially invariant), the optical sensor 115 is robust to the ambient light level (amb) and also to momentary shadows and reflections. It should be understood that the pulse duration of the LED 420 and sampling of the phototransistor 430 may be altered. The result of such processing for the case where strong, variable shadows are present (see FIG. 7C) is illustrated in FIG. 8. Despite occasional errors (mostly due to errors in A/D conversion), the rotation indicator 235 is clearly present at t=0.8 s and t=6.8 s in FIG. 8.

Figure 4C:
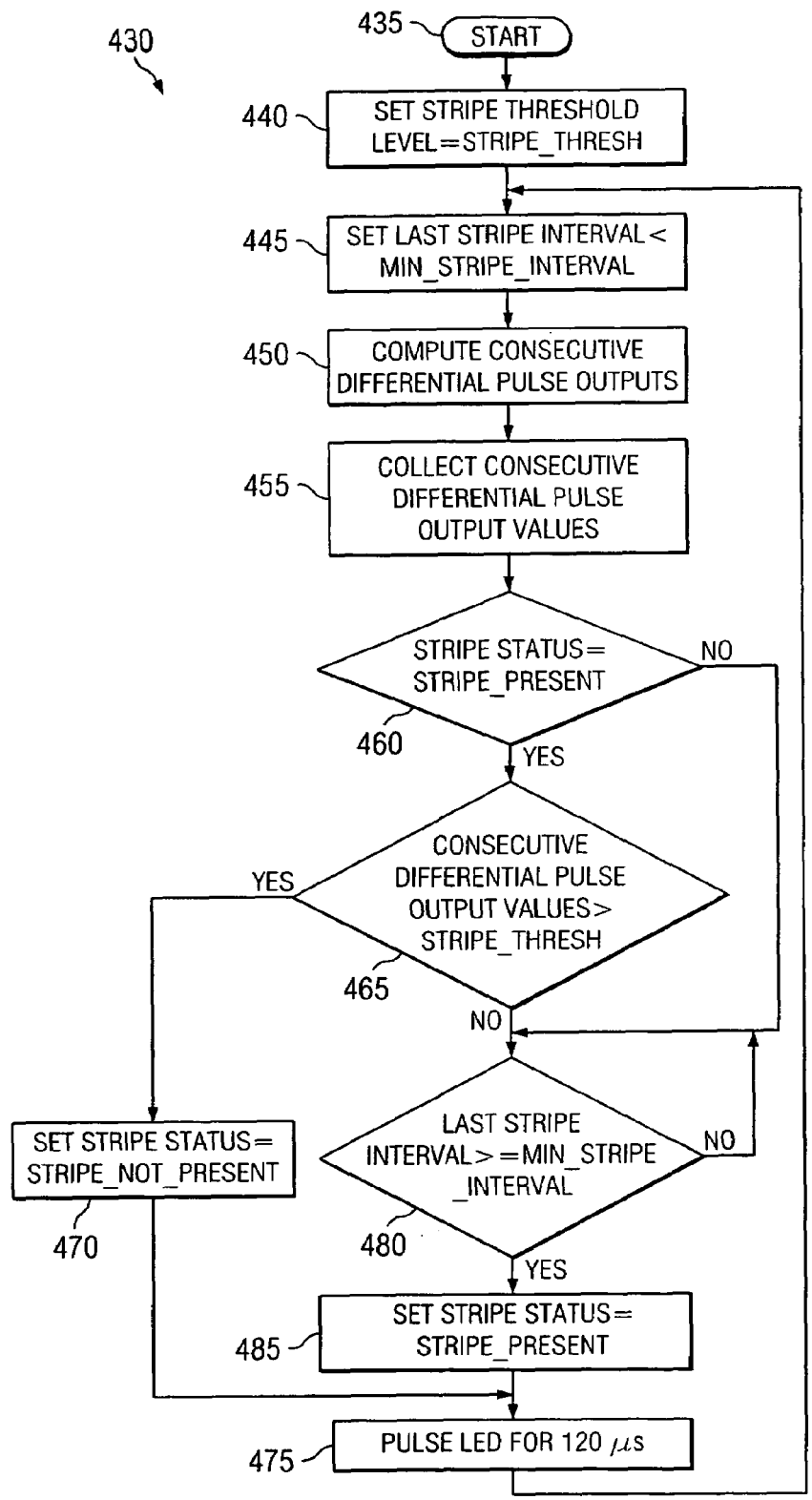

FIG. 4C illustrates an exemplary flow diagram 430 for detecting the rotation indicator 235 on the rotating disk 230 of the power meter 112. The process starts at step 435. At step 440, the software program 335 operating on the processor 310 may assign an optimal threshold level, such as 0.2 volts (V), to a rotation indicator threshold variable, STRIPE_THRESH. This threshold level may work over an entire range of ambient lighting conditions (i.e., dark to intense lighting). It should be understood that if a more robust threshold is desired, the optical sensor 115 may be calibrated so that the indicator reflection voltage difference $S_r$ is below approximately 0.1V and the non-indicator reflection voltage difference $S_r'$ is above approximately 0.3V. The values are arbitrary and may be altered by altering the component values of the sensing circuit 405. If intensely bright ambient light levels cause the sensor output voltage S to saturate (i.e., sensor output voltage S nearly equals power supply voltage V2) and it becomes substantially difficult for the optical sensor 115 to obtain valid power readings, the software program 335 operating on the processor 310 has the capacity to detect this condition and alert the consumer. Alternatively, a more sophisticated circuit may be used to keep the sensor output voltage S within a valid range.

At step 445, the software program 335 may assign a minimum interval length value, such as one second, to a last stripe interval variable, MIN_STRIPE_INTERVAL. This may be based on a calculation of a maximum rotating disk 230 spin rate, which may be further based on an expected maximum instantaneous power. At step 450, the software program 335 may compute the differential sensor output (i.e., either the indicator or non-indicator reflection voltage difference) for each LED pulse generated. In order to produce data that is relatively invariant to ambient light level and fluctuations due to momentary shadows, the differential sensor output for each LED pulse may be computed as previously discussed (i.e., take six samples (three with and without the LED 420 turned on and generate a differential output signal)).

At step 455, the software program 335 may collect a sequence of differential pulse output values at a pulse rate of 120 Hz. This procedure may be performed in order to determine if the stripe is present or not. If a status of the stripe was previously determined, the status becomes the current stripe status until a further determination is made. At step 460, a determination is made whether the current stripe status corresponds to the status STRIPE_PRESENT. If the current stripe status is equal to STRIPE_PRESENT, at step 465, a determination is made whether the consecutive differential pulse output values are greater than the threshold STRIPE_THRESH (e.g., 0.2V). If the consecutive differential pulse output values are greater than STRIPE_THRESH, at step 970, the current stripe status is assigned the status STRIPE_NOT_PRESENT. At step 975, the trigger signal pulses the LED for 120 µs. The process continues at step 445.

Conversely, if the current stripe status does not equal STRIPE_PRESENT at step 460, then at step 480, a determination is made whether the last stripe interval is greater than or equal to MIN_STRIPE_INTERVAL. If the last stripe interval is greater than or equal to MIN_STRIPE_INTERVAL at step 485, the current stripe status is assigned the status STRIPE_PRESENT. If, however, the last stripe interval is less than MIN_STRIPE_INTERVAL, step 480 is repeated. At step 475, the trigger signal pulses the LED for 120 µs. The process continues at step 445.

It should be noted that the above described process may robustly detect the presence of the rotation indicator 235, and may accurately estimate cumulative power usage. The estimated accuracy may be well below an error rate of 1%. It should be understood that alternative algorithms may be utilized to perform a similar functionality to improve robustness in measuring the rotating disk 230 without use of a shield to cover the meter socket 210. As previously mentioned, the optical sensor 115 may be capable of operating properly on a wide variety of power meter models without any tuning or realignment, particularly on the Schlumberger J5S, ABBAB 1R, and GE 1-70-S models. In one embodiment, the sensor mount 225 may have a dial that allows a consumer to finely adjust the beam angle to ensure that the light beam hits the rotating disk 230. A correct reading may be obtained from the optical sensor 115 without any adjustment if horizontal axes of the optical sensor's frame are aligned with the rotating disk 230.

Figure 5B:
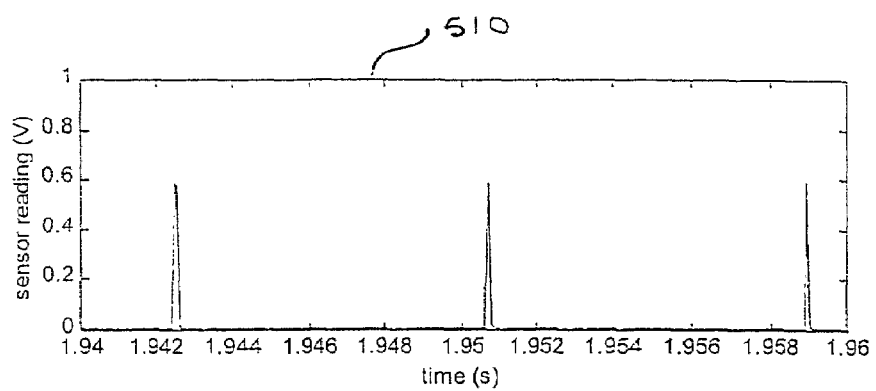
FIGS. 5A and 5B (collectively FIG. 5) illustrate an exemplary plot of sensor output with a pulsed LED using the sensing circuit of FIG. 4.
Figure 5A:
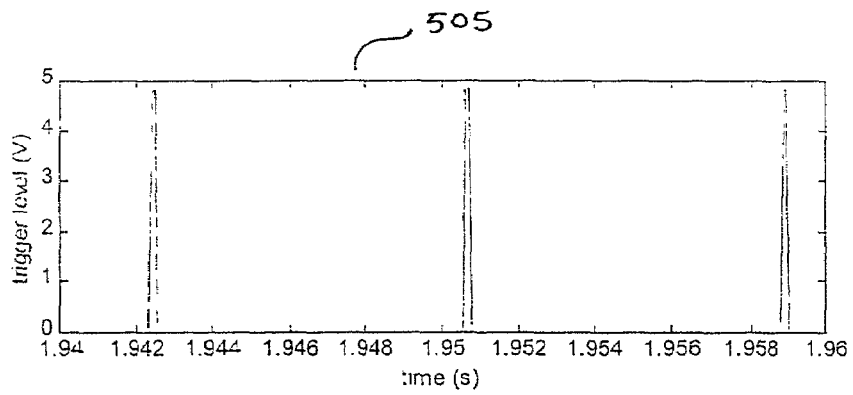

FIGS. 5A and 5B (collectively FIG. 5) illustrate exemplary operational plot of the optical sensor 115 with a pulsed LED 420 using the sensing circuit 400 of FIG. 4 with no ambient light (amb). In operation, according to the principles of the present invention, a trigger signal on the output 415 of the timer 410 controls the pulsing of the LED 420. The trigger signal may pulse the LED 420 "ON" for 120 µs at a 120 Hz rate, as seen in the plot 505. As previously stated, since the phototransistor 430 is sensitive to the light emitted by the LED (i.e., incident beam of light (i)) light reflected (r,) by the rotating disk 230 onto the phototransistor 430 generates a sensor reading, which may be averaged over multiple non-indicator reflection voltage difference $S_r$, as illustrated in plot 510. The sensor readings in plot 510 being 0.6V indicate that the rotating indicator 235 was not present during pulsing of the LED 420. If, however, a low indicator reflection voltage difference (approximately 0.1V, not shown) is measured during the LED pulse, that would indicate that the rotation indicator 235 was present (i.e., illuminated by the LED 420).

Figure 6A:
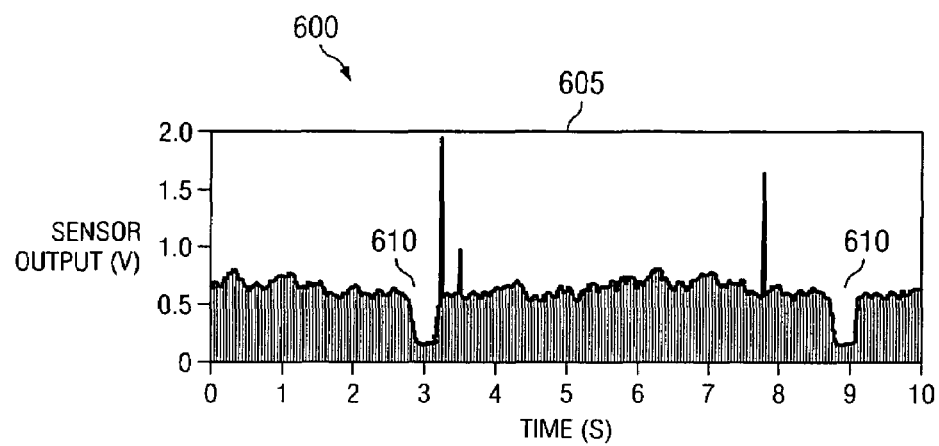
FIGS. 6A and 6B (collectively FIG. 6) illustrate an exemplary plot of data sampling of a sensor signal while the optical sensor of FIG. 2 is exposed to indoor bright ambient lighting conditions.
Figure 6B:
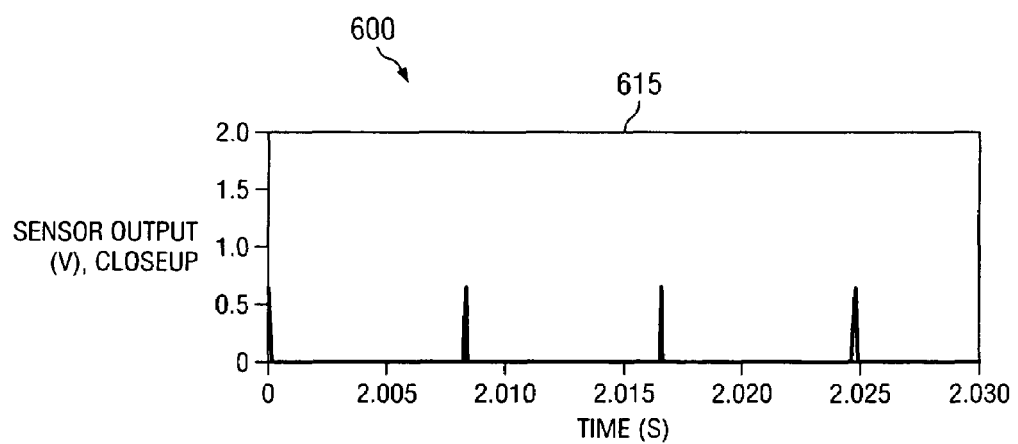

FIGS. 6A and 6B (collectively FIG. 6) illustrate an exemplary plots 600 of data sampling of the signal S generated by the phototransistor 430 while being exposed to indoor bright ambient lighting (amb) conditions. Plot 605 illustrates sensor signal data being sampled over a ten second period with an indoor ambient lighting (amb) condition. When the rotation indicator 235 is present over a time span 610, the sensor reading goes down to an average of approximately 0.1V $(S_r'=\overline{(S_1'S_2'S_3')}-\overline{(S_4'S_5'S_6')})$ from an average of approximately 0.6V $(S_r'=\overline{(S_1'S_2'S_3')}-\overline{(S_4'S_5'S_6')})$ during the LED pulse. It is apparent that the rotation indicator 235 was illuminated by the LED 420 and measured by the sensing circuit 405 at the two time spans 610 at approximately three and, nine seconds (t=3 s and t=9 s). Again, the high sensor reading of 0.6V indicates that the rotation indicator 235 is not present. It should be understood that circuitry or software may be utilized to invert or alter the values of the sensed signals, but that the functionality of the sensor terminal 120 may be substantially the same.

Plot 615 (FIG. 6B) illustrates a close-up of the sensor signal data. The LED 420 is pulsed every 1/120 seconds (i.e., 120 Hz) for 120 μs. The frequency at which the sensor signal data is sampled (e.g., 25 KHz) during the pulse of the LED (i.e., during the 120 μs) allows the sensing circuit 405 to robustly detect the presence of the rotation indicator 235— even under challenging lighting conditions.

Figure 7A:
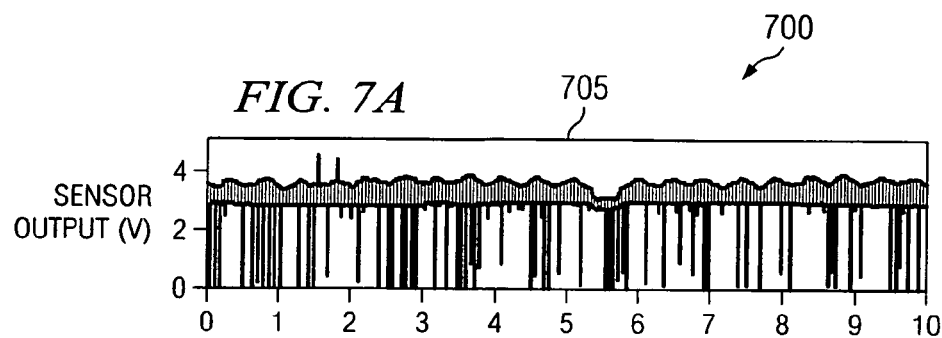
FIGS. 7A, 7B and 7C illustrate an exemplary plots of data sampling of sensor output while the optical sensor of FIG. 2 is exposed to challenging lighting conditions.
Figure 7B:
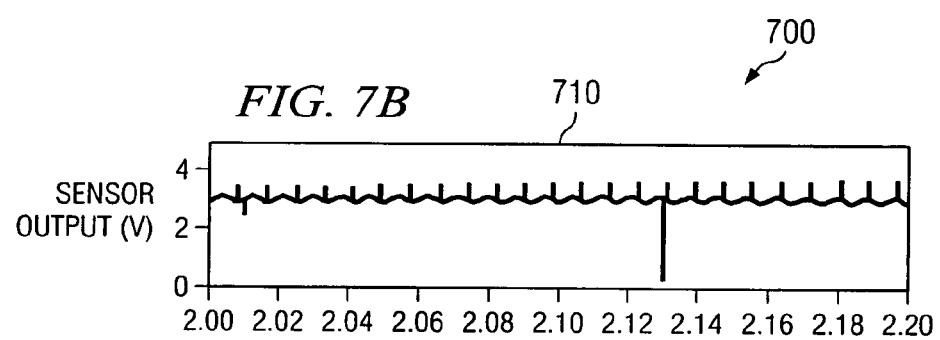
Figure 7C:
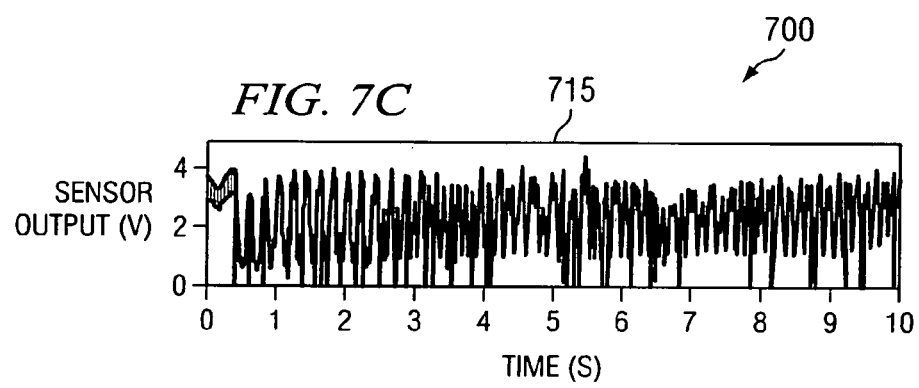

FIGS. 7A, 7B and 7C (collectively FIG. 7) illustrate exemplary plots 700 of data sampling by the optical sensor 115 while exposed to challenging ambient lighting (amb) conditions. While the plots provide for an indication as to the effectiveness of the optical sensor 115, these plots are illustrative of various ambient lighting (amb) conditions that the sensor may be exposed while in operation. These ambient lighting conditions generally define the environment that use of the optical sensor 115 according to the principles of the present invention, and provide design guidelines for design of the optical sensor 115 and sensor terminal 120.

Plot 705 (FIG. 7A) illustrates sensor signal data being sampled while exposed to a simulated outdoor brightness level (i.e., ambient lighting (amb)) by showing a bright light, held 10 cm away from optical sensor 115, on the optical sensor 115. The bright light causes the baseline sensor output to be 3V, which may be better observed on plot 710 (FIG. 7B) between times 2.0 and 2.2 seconds. However, the LED pulse still increases the sensor outputs by approximately 0.6V when the rotation indicator 235 is not present and only by approximately 0.1V when the rotation indicator 235 is present. Thus, it is still apparent that the rotation indicator 235 was present at around t=5.8 s.

Plot 710 illustrates yet a more challenging lighting condition. In this example, the optical sensor 115 is exposed to simulated fluctuating shadows produced by waving a hand quickly and repeatedly between the sensor and the incandescent light. From this plot 710, it is not easy to visually discern the presence of the rotation indicator 235. Plot 715 (FIG. 7C) illustrates strong, variable shadows on the optical sensor 115.

FIG. 8 illustrates an exemplary differential output 800 to provide the ability to measure the various simulated lighting conditions of FIG. 7. Despite occasional errors (mostly due to errors in A/D conversion), the rotation indicator 235 is clearly present at t=0.8 s and t=6.8 s. The software program 335 operating on the processor 310 of the sensor terminal 120 may use a measurement technique and/or an algorithm to make the detection of the rotation indicator 235 more robust with regard to difficult lighting conditions (see, FIGS. 7B and 7C). The algorithm may take into account: (i) changes in ambient lighting (amb) (especially if the power meter 205 is mounted outdoors and subject to bright sunlight), (ii) momentary shadows and reflection that might simulate the presence of a rotation indicator 235, and (iii) other noise sources (such as electromagnetic generating devices).

FIG. 9 illustrates exemplary electronics 900 of the display/data collector unit 125 of FIG. 1 The display/data collector unit 125, which may wirelessly communicate with the sensor terminal 120 via the signals 126 for receiving the power usage signals 340, includes a processor 905 coupled to a non-volatile memory 910. The processor 905 is further coupled to an input/output (I/O) device 915, which may be further coupled to a display device 920. The I/O device 915 may be further coupled to a radio 925 and still further be coupled to a radio 930 capable of transmitting and receiving. The radio 930 receives updated information from the data center 195, which may operate an energy audit software program 935 operating on the processor 905.

The display/data collector unit 125 may be in communication with the data center 195 via the telecommunications network 170, the Internet 175, or the wireless communication system 180 as described above. The display/data collector unit 125 may access the data center 195 on a real-time, up-to-date, or non-real-time basis. In one embodiment, the display/data collector unit 125 may be enclosed in a plastic casing. Additionally, the display/data may be powered by the consumer's house power or by batteries, which may be primarily used as backup power in the event of a power outage or accidental disconnection.

The non-volatile memory 910 may store many hours of data, including device number, current date, power usage signals 340, and may be driven by an internal clock within the processor 910. The radio 925 may transmit a wireless polling signal to the sensor terminal 120. Thereafter, the display/data collector unit 125 may (i) collect a pulse count (i.e., number of indicator counts per time period) from the sensor terminal 120, (ii) convert the pulse count to a kilowatt per hour (KWh) power usage value, and/or (iii) store a record of this power usage value in the processor 905.

The display/data collector unit 125 may initiate a call to the data center 195 based on transmission schedules, power failure, and/or when the consumer depresses a "Send Data" button on the face of an interactive display interface. The display/data collector unit 125 may communicate with the data center 195 on at least a daily basis through (i) the existing phone line 171 of the consumer using a telecommunications network 170, (ii) a computer 135 via the Internet 175 or other network, and/or (iii) wirelessly via base transceiver stations (BTSs) 185a–185n. Alternatively, the display/data collection unit 125 may transmit data to the data center 195 on a nightly basis between the hours of 12:00 A.M. and 5:00 A.M., for example.

TABLES 1 and 2 are exemplary data elements uploaded and downloaded, respectively, between the display/data collector unit 125 and data center 195. It should be undestood that other data elements associated with monitoring power usage may additionally and/or alternatively be communicated between the display/data collector unit 125 and data center 195. The uploading and downloading of the data elements are further discussed in relation to FIG. 12.

TABLE 1

Upload Data

Consumer Number
Unit Identifier
Battery Status
Date
Time Stamp
KWh Used Per Time Period
Total KWh Used
Time Power Interrupted
Current Power Outage Status
Local Time

TABLE 2

Download Data

Local Call In Number
Unit Identifier
Conversion Factor
Message (Indicators to Activate)
Total Billing Cycle Estimate Cost
Billing Cycle Cost To Date
Estimate Cost Usage Benchmark For Month
Day and Peak
Cost Per KWh
Changes in Calibration of Usage Indicators
Local Time FIG. 10 is an exemplary illustration 1000 of an interactive display interface of the display/data collector unit 125. The interactive display interface 1005 may include a monitor or display 1010 that is X-lines long and Y-characters wide. The monitor 1010 may use a series of indicators to inform a consumer of the power usage. Alternatively LEDs may be utilized. For example, the monitor 1010 may display appropriate indicators (e.g., alert, peak time, and message indicators) during times defined by the data center 195 and/or power supplier 199. The indicators may provide the consumer with accurate power usage benchmark profiling and/or alerts and messages.

Power usage indicators 1015 may include: (i) latest peak period indicators 1020, (ii) day peak indicators 1025, and (iii) current billing period indicators 1030. The latest peak period indicators 1020 may be calculated using a variance of kilowatts per hour (KWh) actually used during the latest peak period. The KWh may be compared to benchmark data, which is provided by data center 195 for that point-in-time (e.g., peak period). The display/data collector unit 125 may display the variance in a display indicator in response to calibration information from data center 195. For example, the monitor 1010 may be instructed to illuminate or activate one indicator rather than two indicators for a certain percentage of power usage that falls below a benchmark. The day and current billing period indicators 1025 and 1030, respectively, may be calculated in a similar manner as the latest peak indicators 1020.

Notification indicators or alerts 1035 may include: (i) power network status indicators (1040, 1045), (ii) low battery indicators (1050, 1055), (ii) message indicator 1060, and (iv) power failure indicator 1065. The power network status indicators (1040, 1045) provide up-to-date feedback to the consumer concerning peak hours and special times. This feedback information from a power company or service center allows the consumer to interactively decrease their monthly power bill by reducing power usage by being more informed about a change in a status of the power network and higher power costs associated with power constraints of the power network.

The low battery indicator 1055 may be displayed if the display/data collector unit 125 (i) receives a low battery signal from the sensor terminal 120 or (ii) does not receive data from the sensor terminal 120. Similarly, the low battery indicator 1050 may be displayed if a low battery signal is generated by the display/data collector unit 125. Additionally, a notification indicator may be provided to notify the consumer of inefficient or malfunctioning equipment, including appliances, on-site.

The message indicator 1060 is displayed upon instruction from the data center 195 that is intended to notify the consumer that a message is waiting at the data center 195 or at a website associated with the data center 195. If the display/data collector unit 125 reports a power failure (e.g., the display/data collector unit 125 becomes disconnected), the display/data collector unit 125 may display the power failure indicator 1065 to inform the consumer that the power failure has been reported to the data center 195.

Estimated costs indicators 1070 may be included on the monitor 1010 to allow the consumer to view real-time or up-to-date power pricing. For example, by parsing information received from the data center 195, the display/data collector may determine or display (i) an estimated projected cost 1075 for the current billing cycle, and (ii) forecast an estimated billing cycle to date cost 1080. It should be noted that the data center 195 may determine the estimated total cost and estimated cost for billing the cycle to date and communicate the information to the display/data collector unit 125. The display/data collector unit 125 may use an algorithm operating on the processor 905 to project the estimated cost for the billing cycle to date. The results of the algorithm may be based on data received from data center 195, such as: (i) cost of KWh used and (ii) benchmark power usage for the day. In addition, the algorithm may use data computed by display/data collector unit 125, such as (i) variance from the power usage benchmark profile so far during the billing period, and (ii) variance from the power usage benchmark profile for the time of day, where the benchmark profiles may be developed from past performance or estimated based on the profile of the consumer, for example.

The energy audit software program 935 may allow the consumer to view the KWh power usage and dollar usage in table and graph formats on a monitor of a computer 135 The consumer may also forecast the current month's power bill and run "what-if" scenarios. Alternatively, the consumer may access a website (not shown) associated with the data center 195 to view more detailed information on the Internet. For instance, the website may provide the consumer with (i) highly customizable hourly, daily and monthly energy usage graphs, and (ii) personalized suggestions on how to conserve power.

The data center 195 or utility provider may give the consumer a rebate if they reduce demand during a power constraint, such as a peak period. If the consumer reduces their power usage during the power constraint by a specified amount, the data center 195 may notify the consumer through the display/data collector unit 125 by the alerts 1040 and 1045, for example. Thereafter, the display/data collector unit 125 may use an algorithm to determine actual power reduced during the power constraint and approximate cost savings that the consumer is entitled to receive based on a current billing rate for KWh used. In addition, the algorithm deducts the cost savings from the estimated total cost for the current billing cycle 1075. Thereafter, an adjusted estimated total cost for the current billing cycle 1075 may be displayed in the estimated costs section 1070. It should be understood that the consumer may not receive a cost savings if a specified amount of power, which may be determined by the data center 195, is not conserved.

An information section 1085 may display both text and images in providing information to the consumer. In one embodiment, the information section 1085 may provide information 1090, new flash 1092, and an advertisement 1094. The information 1090 may be personal information and provide the consumer with recent payment information. The new flash 1092 may provide information to the consumer regarding the affect of a heat wave on the power grid. The advertisement 1094 may provide the consumer with information of a local, regional, or national company that may offer products and/or services to consumers. Finally, a refresh button or area 1096 may allow the consumer to refresh the display. It should be understood that the display/data collector unit 125 may include buttons or other selectors to allow the consumer to interact with the interactive display interface 1005. Still yet, the interactive display interface 1005 may be a touch screen to allow the consumer to touch an area, such as the advertisement, via a stylus or otherwise to prompt for additional advertisement information to be downloaded as understood in the art.

In an alternative embodiment, the display/data collector unit 125 may have the capacity to allow the consumer to conduct a transaction between the data center 195 or power supplier 199. In addition the display/data collector unit 125 may be upgraded with communication electronics (e.g., wireless, household wiring, etc.) to automatically control certain household devices, such as thermostat, washer, dryer, and water heater, during times of high power cost or power constraints on the power grid.

Figure 11A:
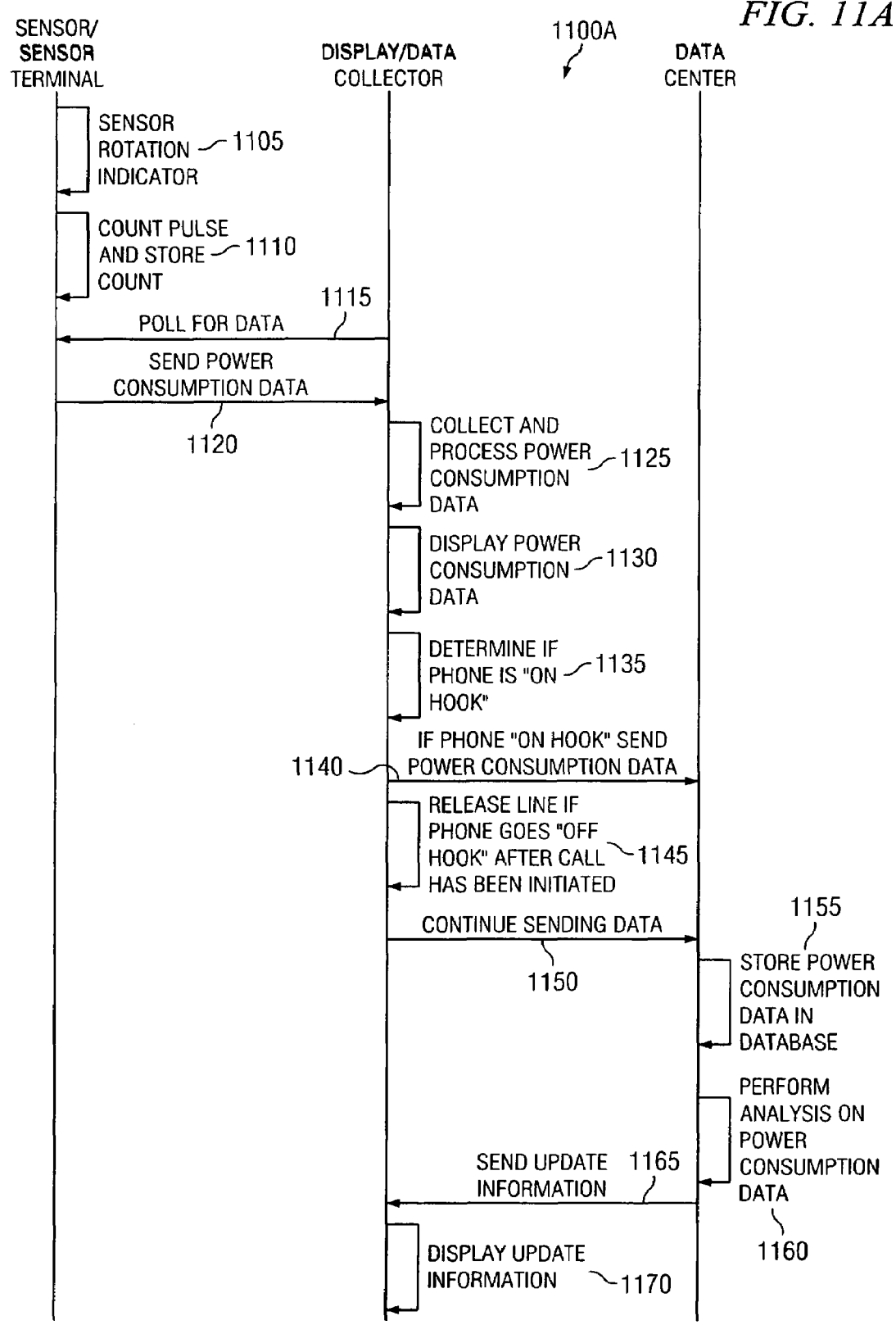
FIGS. 11A and 11B illustrate exemplary interaction diagrams to perform communication of data functions of the remote power meter monitoring system of FIG. 1.

FIG. 11A illustrates an exemplary interaction diagram 1100A to perform communication of data functions of the remote power meter monitoring system 105 (FIG. 1). The process may include interaction between the optical sensor 115/sensor terminal 120 combination, display/data collector unit 125, and data center 195. It should be understood that a utility service provider (e.g., power supplier 199) and/or data center 195 may simultaneously process power usage data, and that the display/data collector unit 125 may be a stand-alone unit.

At step 1105, the optical sensor 115 may measure power usage by detecting light reflected off the rotation indicator 235 on the rotating disk 230 of the power meter 205. The sensor terminal 120 may count pulses over a duration of time generated by the optical sensor 115 and store the pulse count at step 1110 so that a rate of usage may be computed. Upon a polling request from the display/data collector unit 125 at step 1115, the sensor terminal 120 may transmit the pulse count over the duration of time to the display/data collector unit 125 at step 1120. At step 1125, the display/data collector unit 125 may collect and process the power usage data for the consumer to view at step 1130.

At step 1135, a determination may be made as to whether the consumer's telephone line 171 is "On Hook". If the telephone line is "On Hook", the display/data collector unit 125 may initiate a call (possibly based on transmission schedule) to the data center 195 at step 1140. Otherwise, if telephone line 171 is "Off Hook", the display/data collector unit 125 delays initiation of the call until "On Hook". At step 1145, the display/data collector unit 125 hangs up the telephone line 171 if the telephone line goes "Off Hook" during the call. The display/data collector unit 125 may check the telephone line 171 periodically for an "On Hook" status. Once the "On Hook" status has been established, the display/data collector unit 125 may make another call to the data center 195 and continue transmitting the power usage data at step 1150. At step 1155, the data center 195 may store the power usage data in a database. The data center 195 may then perform analysis on the power usage at step 1160. Upon completing the analysis, the data center 195 may transmit updated information to the display/data collector unit 125 at step 1165. Additionally and/or alternatively, the updated information may be communicated to the display/data collector unit 125 upon next call by the display/data collector unit 125 to the data center 195. The updated information may be automatically displayed on the interactive monitor for the consumer to view at step 1170.

Figure 11B:
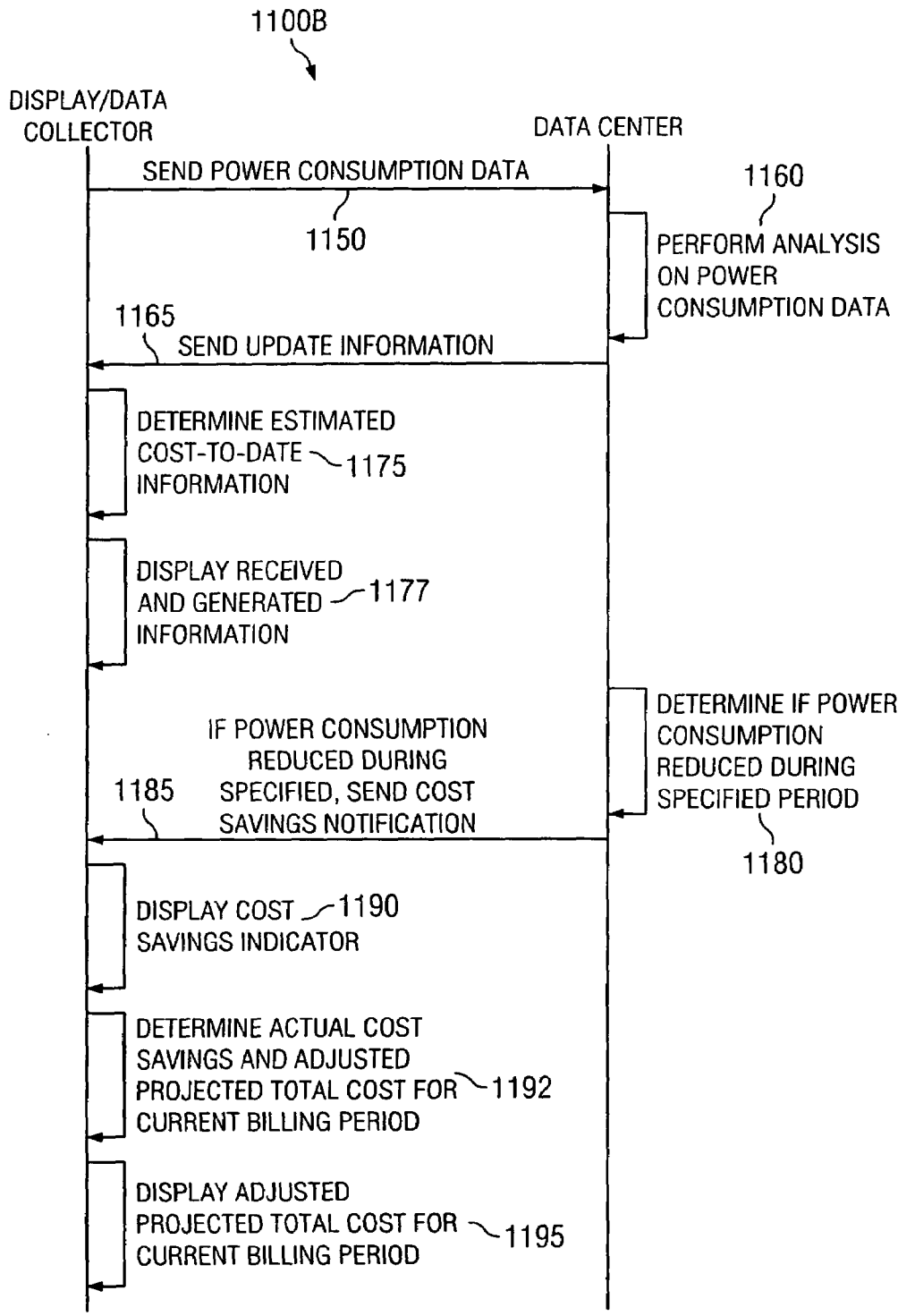

FIG. 11B illustrates an exemplary interaction diagram 1100B to forecast monthly power usage costs for a billing period using the power meter monitoring system (FIG. 1). As previously described in FIG. 11A, data usage information may be communicated between the display/data collector unit 125 and the data center 195 at steps 1150, 1160, and 1165. The display/data collector unit 125 may receive updated information from the data center 195, such as cost-to date estimated cost, billing rate changes, notification of alerts and messages, updated peak period data, substantial weather changes, usage data, and projected total cost for a current billing period. At step 1175, the display/data collector unit 125 may to determine the cost-to-date estimated information, such as cost for the current billing period, projected total cost for the current billing period, and power usage benchmark profile(s). Thereafter, the generated data may be displayed for the consumer to view at step 1177.

At step 1180, the data center 195 may determine whether the consumer has reduced their power usage during a specified time, such as during a peak period that is in effect. If the consumer has actually reduced their power usage during the specified time, the data center 195 may transmit a cost savings notification to the display/data collector unit 125 at step 1185. Upon receiving the cost savings notification, the display/data collector unit 125 may display a cost savings indicator at step 1190. At step 1192, the display/data collector unit 125 may determine actual savings to be credited to the consumer's projected total cost for the current billing period. Thereafter, at step 1195, the display/data collector unit 125 may display an adjusted projected total cost for the billing for the consumer to view.

Figure 12:
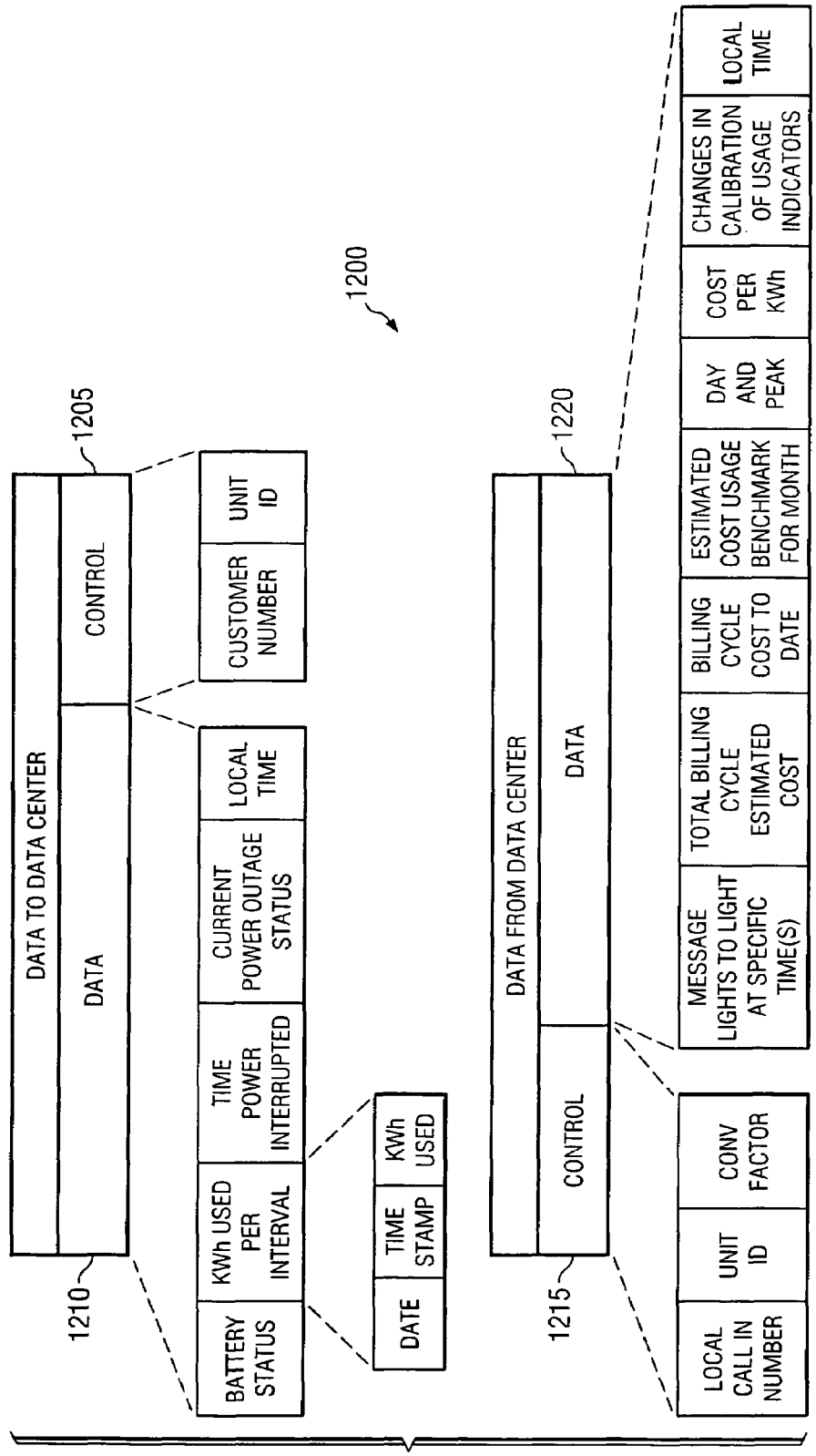
FIG. 12 illustrates an exemplary classification of data communicated between the display/data collector unit to a data center to provide billing information to the consumer using the remote power meter monitoring system of FIG. 1

FIG. 12 illustrates an exemplary classification 1200 of data communicated between the display/data collector unit 125 to a data center 195 to provide billing information to the consumer using the remote power meter monitoring system 105. The display/data collector unit 125 may transmit control data 1205 to the data center 195, such as (i) a unique identifier for the display/data collector unit 125 and (ii) a consumer number. As understood in the art, the control data also may include communication data based on industry communication standards. Additionally, the display/data collector unit 125 may transmit standard data 1210 to the data center 195, such as (i) kilowatts per hour (KWh) used in specific time intervals (e.g., 5 minute intervals), which may further include a date and timestamp for each interval (e.g., power usage data), (ii) battery status for the display/data collector unit 125 and sensor terminal 120, (iii) current power outage status, (iv) time power interrupted, and (v) local time.

The display/data collector unit 125 may be set-up to receive control data 1215 from the data center 195, such as a unique identifier for the sensor terminal 120, conversion factor, and local call-in number, if available. Moreover, the display/data collector unit 125 may receive standard data 1220 from the data center 195, such as (i) indication of which message indicators to display and during particular times of the day, (ii) current billing cycle estimated total cost, (iii) changes in calibration of power usage message indicators, (iv) latest power usage benchmark data, and (v) local time. It is understood that the data communicated in the data packets are exemplary. Furthermore, the data packets may be communicated utilizing techniques known in the art over terrestrial and satellite communication networks. Upon receipt of the data packets, the display/data collector unit 125 may parse the data packets to extract the data 1220 using techniques known in the art.

FIG. 13 is an exemplary block diagram 1300 for providing commercialization of the remote power meter monitoring system 105. As shown, there exists three parties involved in the commercialization process including (i) a utility 1305, (ii) consumer 1310, and (iii) service center 1315. These three parties are basically ones that are involved with marketing, sales, and use of the remote power meter monitoring system 105. However, there may be other parties involved, including sales people, external marketing firms, etc. Additionally, the service center 1315 may be owned by, a subsidiary of or a licensee of the utility 1305, for example.

Each of the parties benefits from the commercialization of the remote power meter monitoring system 105. The utility 1305 collects a monthly fee or a portion thereof sales fees for the optical sensor 115, sensor terminal 120, and display/data collector unit 125, and potentially reduces demand on the power grid. The consumer 1310 potentially saves money on a monthly basis by having up-to-date information (e.g., alerts) regarding pricing and power grid capacity, rebates, and projected monthly costs. The service center 1315 may collect a monthly fee and possibly sales fees for the sensor and display/data collector units 120 and 125.

In one embodiment, a mutually beneficial relationship between the parties exists. Generally, the consumer 1310 receives power from the utility 1305 and communicates with the service center via the remote power meter monitoring system 105, specifically via the display/data collector unit 125. The service center 1315 may provide services for the utility 1305 to service the consumer and collect power usage fees. Alternatively, the service center 1315 may report power usage fees to the utility 1305 to collect from the consumer 1310. Specifically, the utility 1305 provides power to the consumer 1310 at 1320 and the consumer pays the utility 1305 for the power usage at 1325. The utility 1305 may provide the optical sensor 115, sensor terminal 120 and display/data collector unit 125 to the consumer 1310 at 1330. In another embodiment, a consumer list of the utility 1305 may be provided to the service center 1315 at 1340 to market the sensor unit and display/data collector unit 120 and 125. The service center 1315 may provide the consumer 1310 with the optical sensor 115, sensor terminal 120 and display/data collector unit 125. The providing of the units 115, 120, and 125 may include selling, distributing, licensing, and installing, for example. In providing the units, incentive(s) at 1335 maybe offered to the consumer 1310 by the utility 1305 and/or service center 1315, where the incentive(s) may include forming an agreement for a discount on power usage (present and/or future), providing discounted or free units, providing a rebate on goods and/or services. According to the principles of the present invention, the consumer 1310 may install the optical sensor 115 and sensor terminal 120 at 1345 without the aid of a certified technician. Alternatively, a technician may install the optical sensor 115 and sensor terminal 120. An incentive may be provided for self installation, including providing the optical sensor 115 and sensor terminal 120 for free or providing a rebate on a future power usage bill.

In operation, the service center 1315 may collect status information of the power grid and utility 1305, including: up-to-date cost of electric energy, energy supply shortage (e.g., brownout and blackout), and power grid operational status (e.g., under repair, malfunction). The service center 1315 may transmit the status information in the form of a notification or alert to the consumer 1310 at 1350 and receive power usage information from the consumer at 1350. The notification or alert may be displayed on the display/data collector unit 125. Alternatively, other devices may be utilized to output the information to the consumer 1310. The information from the consumer 1310 may be indicative of the consumer 1310 altering energy usage in response to the notification. The service center 1350 may provide data and/or money received from the consumer 1310 to the utility 1305 at 1355. The data may include information indicative of altering energy usage in response to the notification or rebate due based on utilization of the remote power meter monitoring system 105. Additionally, the utility may provide relevant data to the service center 1350, which may be communicated to the consumer 1310.

The previous description is of an embodiment for implementing the invention, and the scope of the invention should not necessarily be limited by this description. The scope of the present invention is instead defined by the following claims.

What is claimed is:

1. A method for measuring power usage from a power meter having a meter socket and a rotating disk disposed within the meter socket and marked with a rotation indicator, said method comprising:
   illuminating the rotating disk at successive positions with an incident beam of light from a position outside the meter socket while exposed to ambient light;
   sensing both the ambient light and the light reflected from the incident beam of light to generate a first signal and sensing the ambient light alone to generate a second signal at the successive position;
   comparing the two signals to generate a reflection signal indicative of the light reflected from the incident beam of light at the successive positions; and
   comparing successive reflective signals to detect the presence of the rotation indicator and generate rotation detect signals in response to revolutions of the rotating disk indicative of the power usage.

2. The method according to claim 1, wherein the ambient light includes at least one of the following light levels: dark, natural brightness, intense brightness, and variable brightness.

3. The method according to claim 1, wherein the information indicative of the power usage is transmitted to a data collection unit, the data collection unit including a display operable to display the information indicative of the power usage to a user.

4. The method according to claim 3, further comprising processing the rotation detect signals to determine power usage over a duration of time.

5. The method according to claim 3, further comprising communicating the rotation detect signals to the data center to analyze and provide feedback indicative of projected power usage to the data collection unit 6. The method according to claim 5, wherein the feedback indicative of the projected power usage informs the user of the data collection unit of least one of the following: saving money on power bills, reducing power usage, and projecting a current monthly power bill.

7. A method for determining power usage of a utility consumer from a power meter having a rotating disk having a rotation indicator, said method comprising:
   directing a source beam toward a position of the rotating disk capable of intersecting the rotation indicator;
   measuring at least one first reflectance value of the source beam reflected from the rotating disk;
   measuring at least one second reflectance value absent the source beam from the rotating disk at a predetermined time difference of said measuring the at least one first reflectance value of the source beam; and
   computing a value as a function of the at least one first and second reflectance value, the value being indicative of the source beam intersecting the rotation indicator.

8. The system according to claim 7, wherein the source beam is at least one of infrared and optical.

9. The system according to claim 7, wherein the predetermined time difference is at most approximately 350 microseconds.

10. The system according to claim 7, wherein said computing includes generating a difference value.

11. The system according to claim 7, further comprising determining a maximum of the at least one first reflectance value and a minimum of the at least one second reflectance value.

12. The system according to claim 7, wherein said measuring the at least one second reflectance value is performed prior to said measuring the at least one first reflectance value.

13. The system according to claim 7, wherein the predetermined time difference is a maximum time difference that altering lighting conditions are substantially invariant.

14. A system for determining power usage of a utility consumer from a power meter having a rotating disk having a rotation indicator, said system comprising:
   means for directing a source beam toward a position of the rotating disk capable of intersecting the rotation indicator;
   means for measuring at least one first reflectance value of the source beam reflected from the rotating disk;
   means for measuring at least one second reflectance value absent the source beam from the rotating disk at a predetermined time difference of said measuring the at least one first reflectance value of the source beam; and
   means for computing a value as a function of the at least one first and second reflectance value, the value being indicative of the source beam intersecting the rotation indicator.

15. An apparatus for determining power usage of a utility consumer from a power meter having a rotating disk having a rotation indicator, said apparatus comprising:
   a timing source operable to generate a timing signal;
   a source beam producing element coupled to the timing source, and directed to the rotating disk at a location capable of intersecting the rotation indicator, the source beam producing element operable in response to the timing signal of said timing source;
   a source beam receptor operable to react to a source beam produced by said source beam producing element; and
   a sampling generator coupled to said source beam receptor, and operable to provide a plurality of samples from said source beam receptor, at least one first sample occurring during operation of the source beam producing element and at least one second sample occurring during the absence of the operation of the source beam producing element, the at least one first and second samples occurring within a time duration that altering lighting conditions are substantially invariant.

16. The apparatus according to claim 15, wherein said timing source is a timing circuit.

17. The apparatus according to claim 15, wherein said source beam producing element is a light emitting diode.

18. The apparatus according to claim 15, wherein said source beam receptor is a phototransistor.

19. The apparatus according to claim 15, wherein said sampling generator is timing circuit.

20. The apparatus according to claim 15, wherein the time duration is a maximum of approximately 350 microseconds.

\* \* \* \* \*